(12) United States Patent
Fang

(10) Patent No.: US 10,135,493 B2
(45) Date of Patent: Nov. 20, 2018

(54) SYSTEM AND METHOD FOR CONTROLLING RADIO BASE STATION, AND RELATED DEVICE

(71) Applicant: Huawei Technologies Co., Ltd., Shenzhen (CN)

(72) Inventor: Qingyin Fang, Shenzhen (CN)

(73) Assignee: HUAWEI TECHNOLOGIES., LTD., Shenzhen (CN)

(*) Notice: Subject to any disclaimer, the term of this patent is extended or adjusted under 35 U.S.C. 154(b) by 0 days.

(21) Appl. No.: 15/804,103

(22) Filed: Nov. 6, 2017

(65) Prior Publication Data

US 2018/0062703 A1    Mar. 1, 2018

Related U.S. Application Data

(63) Continuation of application No. 15/276,435, filed on Sep. 26, 2016, now Pat. No. 9,813,113, which is a (Continued)

(30) Foreign Application Priority Data

Mar. 25, 2014    (CN) .......................... 2014 1 0115041

(51) Int. Cl.
*H04B 3/54* (2006.01)
*H04W 88/08* (2009.01)
(Continued)

(52) U.S. Cl.
CPC .................. *H04B 3/54* (2013.01); *H02J 1/00* (2013.01); *H02J 9/06* (2013.01); *H04W 88/085* (2013.01)

(58) Field of Classification Search
CPC .... H04B 3/54; H02J 1/00; H02J 9/06; H04W 88/085
See application file for complete search history.

(56) References Cited

U.S. PATENT DOCUMENTS

| 6,169,451 B1 | 1/2001 | Kim et al. |
| 2010/0111201 A1 | 5/2010 | Sakai |

(Continued)

FOREIGN PATENT DOCUMENTS

| CN | 101035350 A | 9/2007 |
| CN | 101247575 A | 8/2008 |

(Continued)

OTHER PUBLICATIONS

Foreign Communication From A Counterpart Application, Chinese Application No. 201410115041.5, Chinese Office Action dated Jan. 19, 2018, 6 pages.

(Continued)

*Primary Examiner* — Janice N Tieu
(74) *Attorney, Agent, or Firm* — Conley Rose, P.C.

(57) ABSTRACT

In a system for controlling a radio base station, an out-of-band emergency channel based on a power cable is established between a BBU and an RRU, so that even if a unique communications interface CPRI between the BBU and the RRU is abnormal, the BBU can still effectively control the RRU using the out-of-band emergency channel. In another system for controlling a radio base station, out-of-band emergency channels based on power cables are established among multiple RRUs, so that even if a unique communications interface CPRI between a BBU and a target RRU is abnormal, the BBU can still effectively control the target RRU using an out-of-band emergency channel between any RRU (a unique communications interface CPRI of the RRU is normal) and the target RRU. In the present disclosure, the BBU can effectively control the RRU.

4 Claims, 19 Drawing Sheets

Related U.S. Application Data continuation of application No. PCT/CN2014/089715, filed on Oct. 28, 2014.

(51) Int. Cl.
*H02J 1/00* (2006.01)
*H02J 9/06* (2006.01)

(56) References Cited

U.S. PATENT DOCUMENTS

| | | | |
|---|---|---|---|
| 2011/0051820 A1 | 3/2011 | Fornage | |
| 2011/0158332 A1 | 6/2011 | Wu et al. | |
| 2013/0017852 A1* | 1/2013 | Liu | H04W 88/085 455/509 |
| 2013/0070819 A1 | 3/2013 | Zhao et al. | |
| 2013/0077604 A1* | 3/2013 | Chen | H04W 4/00 370/336 |
| 2013/0237161 A1 | 9/2013 | Zhao et al. | |
| 2013/0308626 A1 | 11/2013 | Feng et al. | |
| 2015/0382211 A1 | 12/2015 | Chen et al. | |
| 2016/0198523 A1* | 7/2016 | Wang | H04B 1/38 455/561 |

FOREIGN PATENT DOCUMENTS

| | | |
|---|---|---|
| CN | 101647207 A | 2/2010 |
| CN | 102149224 A | 8/2011 |
| CN | 102308437 A | 1/2012 |
| CN | 102474303 A | 5/2012 |
| CN | 102647804 A | 8/2012 |
| EP | 2343777 A1 | 7/2011 |
| EP | 2373116 A1 | 10/2011 |
| EP | 2387166 A1 | 11/2011 |
| EP | 2533438 A1 | 12/2012 |

OTHER PUBLICATIONS

Machine Translation and Abstract of Chinese Publication No. CN101035350, Sep. 12, 2007, 6 pages.
Machine Translation and Abstract of Chinese Publication No. CN101247575, Aug. 20, 2008, 12 pages.
Machine Translation and Abstract of Chinese Publication No. CN102647804, Aug. 22, 2012, 24 pages.
Foreign Communication From A Counterpart Application, PCT Application No. 14886674.2, Extended European Search Report dated Jul. 10, 2017, 19 pages.
Foreign Communication From A Counterpart Application, European Application No. 14886674.2, Partial Supplementary European Search Report dated Mar. 7, 2017, 8 pages.
Foreign Communication From A Counterpart Application, PCT Application No. PCT/CN2014/089715, English Translation of International Search Report dated Jan. 26, 2015, 2 pages.
Foreign Communication From A Counterpart Application, PCT Application No. PCT/CN2014/089715, English Translation of Written Opinion dated Jan. 26, 2015, 24 pages.

* cited by examiner

SYSTEM AND METHOD FOR CONTROLLING RADIO BASE STATION, AND RELATED DEVICE

CROSS-REFERENCE TO RELATED APPLICATIONS

This application is a continuation of U.S. patent application Ser. No. 15/276,435, filed on Sep. 26, 2016, now U.S. Pat. No. 9,813,113, which is a continuation of International Application No. PCT/CN2014/089715, filed on Oct. 28, 2014, which claims priority to Chinese Patent Application No. 201410115041.5, filed on Mar. 25, 2014. All of the aforementioned patent applications are hereby incorporated by reference in their entireties.

TECHNICAL FIELD

The present disclosure relates to the field of communications technologies, and in particular, to a system and method for controlling a radio base station, and a related device.

BACKGROUND

With development of mobile communications technologies, large quantities of radio base stations are distributed in places requiring mobile communications coverage, such as cities and rural regions. A typical radio base station mainly includes a baseband unit (BBU), a remote radio unit (RRU), a power supply system, a backup power supply system, and a direct current power distributor. A function of the power supply system is to convert an input alternating current into a direct current, and supply a direct current to the BBU (mainly including a BBU service unit) and the RRU (mainly including an RRU service unit) by using the direct current power distributor. A function of the backup power supply system is to supply a direct current to the BBU and the RRU by using the direct current power distributor in a case of an alternating current power outage. In practice, the BBU, the power supply system, the backup power supply system, and the direct current power distributor are generally installed at the tower bottom for ease of manual maintenance, but the RRU is generally installed at the tower top close to an antenna to reduce a feeder loss. The BBU exchanges service data with the RRU by using a common public radio interface (CPRI), and the BBU can perform control (such as automatic reset, fault query, diagnosis, and fault recovery) on the RRU (mainly the RRU service unit) by using the CPRI.

In practice, it is found that the BBU controls the RRU depending on the unique communications interface CPRI. When the CPRI is abnormal, the BBU loses the capability of controlling the RRU.

SUMMARY

Embodiments of the present disclosure disclose a system and method for controlling a radio base station, and a related device, so that a BBU can effectively control an RRU.

A first aspect of the embodiments of the present disclosure discloses a system for controlling a radio base station, including a power supply system, a backup power supply system, a direct current power distributor, a baseband unit BBU, and at least one remote radio unit RRU, where an input port of the direct current power distributor is connected to direct current ports of the power supply system and the backup power supply system, the BBU and the RRU are respectively connected to direct current power supply ports of the direct current power distributor by using power cables, and the BBU is communicatively connected to the RRU by using a common public radio interface CPRI, where the control system further includes a central monitoring module, where the central monitoring module is communicatively connected to the BBU and is connected to a direct current power supply port of the direct current power distributor by using a power cable, where the central monitoring module is configured to receive RRU control information that is transmitted by the BBU and includes a control instruction, modulate the RRU control information onto the power cable, and transmit the RRU control information to the direct current power distributor; the direct current power distributor is configured to transmit the RRU control information to the RRU by using the power cable; and the RRU is configured to demodulate, from the power cable, the RRU control information including the control instruction, and perform a corresponding control operation in response to the control instruction.

In a first possible implementation manner of the first aspect of the embodiments of the present disclosure, the RRU includes a first power input unit, a first power conversion unit, a first control unit, a first power cable communications unit, an RRU service unit, and a CPRI unit, where the first power conversion unit and the first power cable communications unit respectively establish a power cable connection to the direct current power supply port of the direct current power distributor by using the first power input unit; the first power conversion unit is configured to perform magnitude conversion on a direct current distributed by the direct current power distributor, and output a converted direct current to the first power cable communications unit, the first control unit, and the RRU service unit; the first control unit is communicatively connected to the first power cable communications unit and the RRU service unit; the RRU service unit is communicatively connected to the CPRI unit, and the CPRI unit is configured to communicatively connect to the BBU; the first power cable communications unit is configured to demodulate, from the power cable, the RRU control information that is transmitted by the direct current power distributor by using the first power input unit and includes the control instruction, and transmit the RRU control information to the first control unit; the first control unit is configured to identify a to-be-performed operation type according to the control instruction included in the RRU control information, where the operation type is any one of an operation type performed by the RRU service unit, a power operation type, and a status information collection operation type; and when the operation type is the operation type performed by the RRU service unit, the first control unit transmits the control instruction to the RRU service unit, so as to trigger the RRU service unit to perform a corresponding control operation.

With reference to the first possible implementation manner of the first aspect of the embodiments of the present disclosure, in a second possible implementation manner of the first aspect of the embodiments of the present disclosure, the first power conversion unit is communicatively connected to the first control unit, and the first control unit is further configured to transmit the control instruction to the first power conversion unit when the operation type is the power operation type, so as to trigger the first power conversion unit to perform a corresponding power control operation in response to the control instruction, where the power control operation includes a power-on or power-off control operation.

With reference to the first or second possible implementation manner of the first aspect of the embodiments of the present disclosure, in a third possible implementation manner of the first aspect of the embodiments of the present disclosure, the RRU further includes a first monitoring and collecting unit, where the first monitoring and collecting unit is communicatively connected to the first control unit; and the first control unit is further configured to transmit the control instruction to the first monitoring and collecting unit when the operation type is the status information collection operation type, so as to trigger the first monitoring and collecting unit to collect status information of the RRU, where the status information of the RRU includes status information of the RRU service unit of the RRU.

With reference to the first aspect of the embodiments of the present disclosure or any one of the first to third possible implementation manners of the first aspect of the embodiments of the present disclosure, in a fourth possible implementation manner of the first aspect of the embodiments of the present disclosure, the RRU control information further includes an RRU address, where the RRU address included in the RRU control information is the same as an address of the RRU to which the first power cable communications unit belongs.

With reference to the first aspect of the embodiments of the present disclosure or any one of the first to third possible implementation manners of the first aspect of the embodiments of the present disclosure, in a fifth possible implementation manner of the first aspect of the embodiments of the present disclosure, the central monitoring module is deployed independently of the BBU, and the central monitoring module includes an interface unit, a second power cable communications unit, a second power conversion unit, and a second power input unit, where the second power conversion unit and the second power cable communications unit respectively establish a power cable connection to the direct current power supply port of the direct current power distributor by using the second power input unit; the second power conversion unit is configured to perform magnitude conversion on a direct current distributed by the direct current power distributor, and output a converted direct current to the second power cable communications unit and the interface unit; the interface unit is communicatively connected to the BBU and the second power cable communications unit; the interface unit is configured to receive the RRU control information transmitted by the BBU, and transmit the RRU control information to the second power cable communications unit; and the second power cable communications unit is configured to receive the RRU control information transmitted by the interface unit, modulate the RRU control information onto the power cable, and transmit the RRU control information to the direct current power distributor by using the second power input unit.

With reference to the fifth possible implementation manner of the first aspect of the embodiments of the present disclosure, in a sixth possible implementation manner of the first aspect of the embodiments of the present disclosure, when the operation type is the operation type performed by the RRU service unit, the first control unit is further configured to receive an RRU service unit control result transmitted by the RRU service unit, add the RRU service unit control result and an address of the BBU to response information, and transmit the response information to the first power cable communications unit; or when the operation type is the power operation type, the first control unit is further configured to receive an RRU power control result transmitted by the first power conversion unit, add the RRU power control result and an address of the BBU to response information, and transmit the response information to the first power cable communications unit; and the first power cable communications unit is further configured to receive the response information transmitted by the first control unit, modulate the response information onto the power cable, and transmit the response information to the direct current power distributor by using the first power input unit; the direct current power distributor is further configured to transmit the response information to the second power cable communications unit by using the second power input unit; the second power cable communications unit is further configured to demodulate the response information from the power cable, and transmit the response information to the interface unit; and the interface unit is further configured to transmit the response information to the BBU.

With reference to the fifth possible implementation manner of the first aspect of the embodiments of the present disclosure, in a seventh possible implementation manner of the first aspect of the embodiments of the present disclosure, when the operation type is the status information collection operation type, the first control unit is further configured to receive the status information of the RRU that is transmitted by the first monitoring and collecting unit, add the status information of the RRU and an address of the BBU to status feedback information, and transmit the status feedback information to the first power cable communications unit; the first power cable communications unit is further configured to receive the status feedback information transmitted by the first control unit, modulate the status feedback information onto the power cable, and transmit the status feedback information to the direct current power distributor by using the first power input unit; the direct current power distributor is further configured to transmit the status feedback information to the second power cable communications unit by using the second power input unit; the second power cable communications unit is further configured to demodulate the status feedback information from the power cable, and transmit the status feedback information to the interface unit; and the interface unit is further configured to transmit the status feedback information to the BBU.

With reference to the fifth possible implementation manner of the first aspect of the embodiments of the present disclosure, in an eighth possible implementation manner of the first aspect of the embodiments of the present disclosure, the control system further includes at least one cabinet, where each cabinet is connected to a direct current power supply port of the direct current power distributor by using a power cable, where the BBU is further configured to transmit a cabinet control instruction including an address of a target cabinet to the receiving unit, where the target cabinet is any cabinet in the at least one cabinet; the interface unit is further configured to receive the cabinet control instruction that is transmitted by the BBU and includes the address of the target cabinet, and transmit the cabinet control instruction to the second power cable communications unit; the second power cable communications unit is further configured to modulate the cabinet control instruction onto the power cable, and transmit the cabinet control instruction to the direct current power distributor by using the second power input unit; and the direct current power distributor is further configured to transmit the cabinet control instruction to the target cabinet by using a power cable, so as to trigger the target cabinet to demodulate the cabinet control instruction from the power cable and after determining through comparison that an address of the target cabinet is the same as the address of the target cabinet included in the cabinet control instruction, perform a corresponding control operation in response to the cabinet control instruction.

With reference to the first aspect of the embodiments of the present disclosure or any one of the first to third possible implementation manners of the first aspect of the embodiments of the present disclosure, in a ninth possible implementation manner of the first aspect of the embodiments of the present disclosure, the central monitoring module is integrated in the BBU, and the central monitoring module includes a second control unit and a third power cable communications unit, where a third power conversion unit of the BBU and the third power cable communications unit respectively establish a power cable connection to the direct current power supply port of the direct current power distributor by using a third power input unit of the BBU; the third power conversion unit is configured to perform magnitude conversion on a direct current distributed by the direct current power distributor, and output a converted direct current to the third power cable communications unit, the second control unit, and a BBU service unit of the BBU; the second control unit is communicatively connected to the BBU service unit of the BBU and the third power cable communications unit; the second control unit is configured to receive RRU control information transmitted by the BBU service unit, and transmit the RRU control information to the third power cable communications unit; and the third power cable communications unit is configured to modulate the RRU control information onto the power cable, and transmit the RRU control information to the direct current power distributor by using the third power input unit.

With reference to the ninth possible implementation manner of the first aspect of the embodiments of the present disclosure, in a tenth possible implementation manner of the first aspect of the embodiments of the present disclosure, when the operation type is the operation type performed by the RRU service unit, the first control unit is further configured to receive an RRU service unit control result transmitted by the RRU service unit, add the RRU service unit control result and an address of the BBU to response information, and transmit the response information to the first power cable communications unit; or when the operation type is the power operation type, the first control unit is further configured to receive an RRU power control result transmitted by the first power conversion unit, add the RRU power control result and an address of the BBU to response information, and transmit the response information to the first power cable communications unit; and the first power cable communications unit is further configured to receive the response information transmitted by the first control unit, modulate the response information onto the power cable, and transmit the response information to the direct current power distributor by using the first power input unit; the direct current power distributor is further configured to transmit the response information to the third power cable communications unit by using the third power input unit; the third power cable communications unit is further configured to demodulate the response information from the power cable, and transmit the response information to the second control unit; and the second control unit is further configured to transmit the response information to the BBU service unit.

With reference to the ninth possible implementation manner of the first aspect of the embodiments of the present disclosure, in an eleventh possible implementation manner of the first aspect of the embodiments of the present disclosure, when the operation type is the status information collection operation type, the first control unit is further configured to receive the status information of the RRU that is transmitted by the first monitoring and collecting unit, add the status information of the RRU and an address of the BBU to status feedback information, and transmit the status feedback information to the first power cable communications unit; the first power cable communications unit is further configured to receive the status feedback information transmitted by the first control unit, modulate the status feedback information onto the power cable, and transmit the status feedback information to the direct current power distributor by using the first power input unit; the direct current power distributor is further configured to transmit the status feedback information to the third power cable communications unit by using the third power input unit; the third power cable communications unit is further configured to demodulate the status feedback information from the power cable, and transmit the status feedback information to the second control unit; and the second control unit is further configured to transmit the status feedback information to the BBU service unit.

With reference to the ninth possible implementation manner of the first aspect of the embodiments of the present disclosure, in a twelfth possible implementation manner of the first aspect of the embodiments of the present disclosure, the control system further includes at least one cabinet, where each cabinet is connected to a direct current power supply port of the direct current power distributor by using a power cable, where the BBU service unit is further configured to transmit a cabinet control instruction including an address of a target cabinet to the second control unit, where the target cabinet is any cabinet in the at least one cabinet; the second control unit is further configured to receive the cabinet control instruction that is transmitted by the BBU service unit and includes the address of the target cabinet, and transmit the cabinet control instruction to the third power cable communications unit; the third power cable communications unit is further configured to modulate the cabinet control instruction onto the power cable, and transmit the cabinet control instruction to the direct current power distributor by using the third power input unit; the direct current power distributor is further configured to transmit the cabinet control instruction to the target cabinet by using a power cable; and the target cabinet is configured to demodulate the cabinet control instruction from the power cable, and after determining through comparison that an address of the target cabinet is the same as the address of the target cabinet included in the cabinet control instruction, perform a corresponding control operation in response to the cabinet control instruction.

With reference to the first aspect of the embodiments of the present disclosure or any one of the first to third possible implementation manners of the first aspect of the embodiments of the present disclosure, in a thirteenth possible implementation manner of the first aspect of the embodiments of the present disclosure, the input port of the direct current power distributor is connected to each direct current power supply port of the direct current power distributor by using an internal short-circuit protection unit, so as to implement a power cable connection between the input port of the direct current power distributor and any direct current power supply port.

A second aspect of the embodiments of the present disclosure discloses a system for controlling a radio base station, including a power supply system, a backup power supply system, a direct current power distributor, a baseband unit BBU, and at least two remote radio units RRUs, where an input port of the direct current power distributor is connected to direct current ports of the power supply system and the backup power supply system, the at least two RRUs are respectively connected to direct current power supply ports of the direct current power distributor by using power cables, the BBU is communicatively connected to the at least two RRUs by using a common public radio interface CPRI, and the at least two RRUs include a first RRU and a target RRU, where the BBU is configured to transmit RRU control information to the first RRU by using the CPRI, where the RRU control information includes an address of a target RRU and a control instruction; the first RRU is configured to modulate the RRU control information onto the power cable, and transmit the RRU control information to the direct current power distributor; the direct current power distributor is configured to transmit the RRU control information to the target RRU by using the power cable; and the target RRU is configured to demodulate, from the power cable, the RRU control information transmitted by the direct current power distributor, and after determining that an address of the target RRU is the same as the address of the target RRU included in the RRU control information, perform a corresponding control operation in response to the control instruction included in the RRU control information.

In a first possible implementation manner of the second aspect of the embodiments of the present disclosure, the target RRU includes a first power input unit, a first power conversion unit, a first control unit, a first power cable communications unit, an RRU service unit, and a CPRI unit, where the first power conversion unit and the first power cable communications unit respectively establish a power cable connection to the direct current power supply port of the direct current power distributor by using the first power input unit; the first power conversion unit is configured to perform magnitude conversion on a direct current distributed by the direct current power distributor, and output a converted direct current to the first power cable communications unit, the first control unit, and the RRU service unit; the first control unit is communicatively connected to the first power cable communications unit and the RRU service unit; the RRU service unit is configured to communicatively connect to the BBU by using the CPRI unit; the first power input unit is configured to transmit, to the first power cable communications unit by using a power cable, the RRU control information transmitted by the direct current power distributor; the first power cable communications unit is configured to demodulate, from the power cable, the RRU control information transmitted by the direct current power distributor, and after determining that the address of the target RRU is the same as the address of the target RRU included in the RRU control information, transmit the RRU control information to the first control unit; the first control unit is configured to identify a to-be-performed operation type according to the control instruction included in the RRU control information, where the operation type is any one of an operation type performed by the RRU service unit, a power operation type, and a status information collection operation type; and when the operation type is the operation type performed by the RRU service unit, the first control unit transmits the control instruction to the RRU service unit, so as to trigger the RRU service unit to perform a corresponding control operation.

With reference to the first possible implementation manner of the second aspect of the embodiments of the present disclosure, in a second possible implementation manner of the second aspect of the embodiments of the present disclosure, the first power conversion unit is communicatively connected to the first control unit, and the first control unit is further configured to transmit the control instruction to the first power conversion unit when the operation type is the power operation type, so as to trigger the first power conversion unit to perform a corresponding power control operation in response to the control instruction, where the power control operation includes a power-on or power-off control operation.

With reference to the first or second possible implementation manner of the second aspect of the embodiments of the present disclosure, in a third possible implementation manner of the second aspect of the embodiments of the present disclosure, the target RRU further includes a first monitoring and collecting unit, where the first monitoring and collecting unit is communicatively connected to the first control unit; and the first control unit is further configured to transmit the control instruction to the first monitoring and collecting unit when the operation type is the status information collection operation type, so as to trigger the first monitoring and collecting unit to collect status information of the RRU, where the status information of the RRU includes status information of the RRU service unit of the RRU.

With reference to any one of the first to third possible implementation manners of the second aspect of the embodiments of the present disclosure, in a fourth possible implementation manner of the second aspect of the embodiments of the present disclosure, when the operation type is the operation type performed by the RRU service unit, the first control unit is further configured to receive an RRU service unit control result transmitted by the RRU service unit, add the RRU service unit control result and an address of the BBU to response information, and transmit the response information to the first power cable communications unit; or when the operation type is the power operation type, the first control unit is further configured to receive a target RRU power control result transmitted by the first power conversion unit, add the target RRU power control result and an address of the BBU to response information, and transmit the response information to the first power cable communications unit; and the first power cable communications unit is further configured to modulate the response information onto the power cable, and transmit the response information to the direct current power distributor by using the first power input unit; the direct current power distributor is further configured to transmit the response information to the first RRU; and the first RRU is configured to transmit the response information to the BBU by using the CPRI.

With reference to any one of the first to third possible implementation manners of the second aspect of the embodiments of the present disclosure, in a fifth possible implementation manner of the second aspect of the embodiments of the present disclosure, when the operation type is the status information collection operation type, the first control unit is further configured to receive the status information of the target RRU that is transmitted by the first monitoring and collecting unit, add the status information of the target RRU and an address of the BBU to status feedback information, and transmit the status feedback information to the first power cable communications unit; the first power cable communications unit is further configured to modulate the status feedback information onto the power cable, and transmit the status feedback information to the direct current power distributor by using the first power input unit; the direct current power distributor is further configured to transmit the status feedback information to the first RRU; and the first RRU is further configured to transmit the status feedback information to the BBU by using the CPRI.

With reference to any one of the first to third possible implementation manners of the second aspect of the embodiments of the present disclosure, in a sixth possible implementation manner of the second aspect of the embodiments of the present disclosure, the control system further includes at least one cabinet, where each cabinet is connected to a direct current power supply port of the direct current power distributor by using a power cable, where the BBU is further configured to transmit a cabinet control instruction including an address of a target cabinet to the first RRU, where the target cabinet is any cabinet in the at least one cabinet; the first RRU is further configured to modulate the cabinet control instruction onto the power cable, and transmit the cabinet control instruction to the direct current power distributor; the direct current power distributor is configured to transmit the cabinet control instruction to the target cabinet by using a power cable; and the target cabinet is configured to demodulate the cabinet control instruction from the power cable, and after determining that an address of the target cabinet is the same as the address of the target cabinet included in the cabinet control instruction, perform a corresponding control operation in response to the cabinet control instruction.

With reference to the second aspect of the embodiments of the present disclosure or any one of the first to sixth possible implementation manners of the second aspect of the embodiments of the present disclosure, in a seventh possible implementation manner of the second aspect of the embodiments of the present disclosure, the input port of the direct current power distributor is connected to each direct current power supply port of the direct current power distributor by using an internal short-circuit protection unit, so as to implement a power cable connection between the input port of the direct current power distributor and any direct current power supply port.

A third aspect of the embodiments of the present disclosure discloses a system for controlling a radio base station, including a power supply system, a backup power supply system, a direct current power distributor, a baseband unit BBU, and at least one cabinet, where an input port of the direct current power distributor is connected to direct current ports of the power supply system and the backup power supply system, and the BBU and the at least one cabinet are respectively connected to direct current power supply ports of the direct current power distributor by using power cables, where the control system further includes a central monitoring module, where the central monitoring module is communicatively connected to the BBU and is connected to a direct current power supply port of the direct current power distributor by using a power cable, where the central monitoring module is configured to receive a cabinet control instruction that is transmitted by the BBU and includes an address of a target cabinet, modulate the cabinet control instruction onto the power cable, and transmit the cabinet control instruction to the direct current power distributor, where the target cabinet is any cabinet in the at least one cabinet; the direct current power distributor is configured to transmit the cabinet control instruction to a target cabinet by using the power cable; and the target cabinet is configured to demodulate the cabinet control instruction from the power cable, and after determining that an address of the target cabinet is the same as the address of the target cabinet included in the cabinet control instruction, perform a corresponding control operation in response to the cabinet control instruction.

In a first possible implementation manner of the third aspect of the embodiments of the present disclosure, the central monitoring module is deployed independently of the BBU, and the central monitoring module includes an interface unit, a second power cable communications unit, a second power conversion unit, and a second power input unit, where the second power conversion unit and the second power cable communications unit respectively establish a power cable connection to the direct current power supply port of the direct current power distributor by using the second power input unit; the second power conversion unit is configured to perform magnitude conversion on a direct current distributed by the direct current power distributor, and output a converted direct current to the second power cable communications unit and the interface unit; the interface unit is communicatively connected to the BBU and the second power cable communications unit; the interface unit is configured to receive the cabinet control instruction that is transmitted by the BBU and includes the address of the target cabinet, and transmit the cabinet control instruction to the second power cable communications unit; and the second power cable communications unit is configured to receive the cabinet control instruction transmitted by the interface unit, modulate the cabinet control instruction onto the power cable, and transmit the cabinet control instruction to the direct current power distributor by using the second power input unit.

In a second possible implementation manner of the third aspect of the embodiments of the present disclosure, the central monitoring module is integrated in the BBU, and the central monitoring module includes a second control unit and a third power cable communications unit, where a third power conversion unit of the BBU and the third power cable communications unit respectively establish a power cable connection to the direct current power supply port of the direct current power distributor by using a third power input unit of the BBU; the third power conversion unit is configured to perform magnitude conversion on a direct current distributed by the direct current power distributor, and output a converted direct current to the third power cable communications unit, the second control unit, and a BBU service unit of the BBU; the second control unit is communicatively connected to the BBU service unit of the BBU and the third power cable communications unit; the second control unit is configured to receive a cabinet control instruction that is transmitted by the BBU service unit and includes an address of a target cabinet, and transmit the cabinet control instruction to the third power cable communications unit; and the third power cable communications unit is configured to modulate the cabinet control instruction onto the power cable, and transmit the cabinet control instruction to the direct current power distributor by using the third power input unit.

With reference to the third aspect of the embodiments of the present disclosure or the first or second possible implementation manner of the third aspect of the embodiments of the present disclosure, in a third possible implementation manner of the third aspect of the embodiments of the present disclosure, the input port of the direct current power distributor is connected to each direct current power supply port of the direct current power distributor by using an internal short-circuit protection unit, so as to implement a power cable connection between the input port of the direct current power distributor and any direct current power supply port.

A fourth aspect of the embodiments of the present disclosure discloses a remote radio unit RRU, including a first power input unit, a first power conversion unit, a first control unit, a first power cable communications unit, an RRU service unit, and a common public radio interface CPRI unit, where the first power conversion unit and the first power cable communications unit are respectively configured to establish a power cable connection to a direct current power supply port of a direct current power distributor by using the first power input unit; the first power conversion unit is configured to perform magnitude conversion on a direct current distributed by the direct current power distributor, and output a converted direct current to the first power cable communications unit, the first control unit, and the RRU service unit; the first control unit is communicatively connected to the first power cable communications unit and the RRU service unit; the RRU service unit is communicatively connected to the CPRI unit, and the CPRI unit is configured to communicatively connect to a BBU; the first power cable communications unit is configured to demodulate, from the power cable, RRU control information that is transmitted by the direct current power distributor by using the first power input unit and includes a control instruction, and transmit the RRU control information to the first control unit; the first control unit is configured to identify a to-be-performed operation type according to the control instruction included in the RRU control information, where the operation type is any one of an operation type performed by the RRU service unit, a power operation type, and a status information collection operation type; and when the operation type is the operation type performed by the RRU service unit, the first control unit transmits the control instruction to the RRU service unit, so as to trigger the RRU service unit to perform a corresponding control operation.

In a first possible implementation manner of the fourth aspect of the embodiments of the present disclosure, the first power conversion unit is communicatively connected to the first control unit, and the first control unit is further configured to transmit the control instruction to the first power conversion unit when the operation type is the power operation type, so as to trigger the first power conversion unit to perform a corresponding power control operation in response to the control instruction, where the power control operation includes a power-on or power-off control operation.

With reference to the fourth aspect of the embodiments of the present disclosure or the first possible implementation manner of the fourth aspect of the embodiments of the present disclosure, in a second possible implementation manner of the fourth aspect of the embodiments of the present disclosure, the RRU further includes a first monitoring and collecting unit, where the first monitoring and collecting unit is communicatively connected to the first control unit; and the first control unit is further configured to transmit the control instruction to the first monitoring and collecting unit when the operation type is the status information collection operation type, so as to trigger the first monitoring and collecting unit to collect status information of the RRU, where the status information of the RRU includes status information of the RRU service unit of the RRU.

With reference to the second possible implementation manner of the fourth aspect of the embodiments of the present disclosure, in a third possible implementation manner of the fourth aspect of the embodiments of the present disclosure, the RRU control information further includes an RRU address, where the RRU address included in the RRU control information is the same as an address of the RRU to which the first power cable communications unit belongs.

With reference to the fourth aspect of the embodiments of the present disclosure or the first or second possible implementation manner of the fourth aspect of the embodiments of the present disclosure, in a fourth possible implementation manner of the fourth aspect of the embodiments of the present disclosure, when the operation type is the operation type performed by the RRU service unit, the first control unit is further configured to receive an RRU service unit control result transmitted by the RRU service unit, add the RRU service unit control result and an address of the BBU to response information, and transmit the response information to the first power cable communications unit; or when the operation type is the power operation type, the first control unit is further configured to receive an RRU power control result transmitted by the first power conversion unit, add the RRU power control result and an address of the BBU to response information, and transmit the response information to the first power cable communications unit; and the first power cable communications unit is further configured to modulate the response information transmitted by the first control unit onto the power cable, and transmit the response information to the direct current power distributor by using the first power input unit, so as to trigger the direct current power distributor to transmit the response information to a central monitoring module by using a power cable, so that the central monitoring module demodulates the response information from the power cable and transmits the response information to the BBU; or so as to trigger the direct current power distributor to transmit the response information to the BBU by using a power cable, so that the BBU demodulates the response information from the power cable and transmits the response information to a BBU service unit of the BBU.

With reference to the fourth aspect of the embodiments of the present disclosure or the first or second possible implementation manner of the fourth aspect of the embodiments of the present disclosure, in a fifth possible implementation manner of the fourth aspect of the embodiments of the present disclosure, when the operation type is the status information collection operation type, the first control unit is further configured to receive the status information of the RRU that is transmitted by the first monitoring and collecting unit, add the status information of the RRU and an address of the BBU to status feedback information, and transmit the status feedback information to the first power cable communications unit; and the first power cable communications unit is further configured to modulate the status feedback information transmitted by the first control unit onto the power cable, and transmit the status feedback information to the direct current power distributor by using the first power input unit, so as to trigger the direct current power distributor to transmit the status feedback information to a central monitoring module by using a power cable, so that the central monitoring module demodulates the status feedback information from the power cable and transmits the status feedback information to the BBU; or so as to trigger the direct current power distributor to transmit the status feedback information to the BBU by using a power cable, so that the BBU demodulates the status feedback information from the power cable and transmits the status feedback information to a BBU service unit of the BBU.

With reference to the fourth aspect of the embodiments of the present disclosure or the first or second possible implementation manner of the fourth aspect of the embodiments of the present disclosure, in a sixth possible implementation manner of the fourth aspect of the embodiments of the present disclosure, the RRU service unit is further configured to receive, by using the CPRI unit, RRU control information that is transmitted by the BBU and includes an address of a target RRU and a control instruction, and transmit the RRU control information to the first control unit, where the address of the target RRU is not the same as an address of the RRU; the first control unit is configured to transmit the RRU control information to the first power cable communications unit; and the first power cable communications unit is configured to modulate the RRU control information onto the power cable, and transmit the RRU control information to the direct current power distributor by using the first power input unit, so as to trigger the direct current power distributor to transmit the RRU control information to the target RRU by using a power cable, to perform a corresponding control operation.

With reference to the fourth aspect of the embodiments of the present disclosure or the first or second possible implementation manner of the fourth aspect of the embodiments of the present disclosure, in a seventh possible implementation manner of the fourth aspect of the embodiments of the present disclosure, the RRU service unit is further configured to receive, by using the CPRI unit, a cabinet control instruction that is transmitted by the BBU and includes an address of a target cabinet, and transmit the cabinet control instruction to the first control unit; the first control unit is configured to transmit the cabinet control instruction to the first power cable communications unit; and the first power cable communications unit is configured to modulate the cabinet control instruction onto the power cable, and transmit the cabinet control instruction to the direct current power distributor by using the first power input unit, so as to trigger the direct current power distributor to transmit the cabinet control instruction to the target cabinet by using a power cable, so as to trigger the target cabinet to perform a corresponding control operation in response to the cabinet control instruction.

A fifth aspect of the embodiments of the present disclosure discloses a central monitoring module, including an interface unit, a second power cable communications unit, a second power conversion unit, and a second power input unit, where the second power cable communications unit and the second power conversion unit are respectively configured to establish a power cable connection to a direct current power supply port of a direct current power distributor by using the second power input unit; the second power cable communications unit is communicatively connected to the interface unit, and the interface unit is configured to communicatively connect to a BBU; the second power conversion unit is configured to perform magnitude conversion on a direct current distributed by the direct current power distributor, and output a converted direct current to the second power cable communications unit and the interface unit; the interface unit is configured to receive RRU control information that is transmitted by the BBU and includes a control instruction, and transmit the RRU control information to the second power cable communications unit; and the second power cable communications unit is configured to modulate the RRU control information onto a power cable, and transmit the RRU control information to the direct current power distributor by using the second power input unit, so as to trigger the direct current power distributor to transmit the RRU control information to an RRU by using a power cable, so that the RRU demodulates the RRU control information from the power cable and performs a corresponding control operation in response to the control instruction.

In a first possible implementation manner of the fifth aspect of the embodiments of the present disclosure, the RRU control information further includes an RRU address, where an address of the RRU that performs the corresponding control operation in response to the control instruction is the same as the RRU address included in the RRU control information.

In a second possible implementation manner of the fifth aspect of the embodiments of the present disclosure, when the RRU identifies, according to the control instruction included in the RRU control information, that a to-be-performed operation type is an operation type performed by an RRU service unit, the second power cable communications unit is further configured to demodulate, from the power cable, response information that is transmitted by the direct current power distributor by using the second power input unit and includes an RRU service unit control result and an address of the BBU; or when the RRU identifies, according to the control instruction included in the RRU control information, that a to-be-performed operation type is a power operation type, the second power cable communications unit is further configured to demodulate, from the power cable, response information that is transmitted by the direct current power distributor by using the second power input unit and includes an RRU power control result and an address of the BBU; and the second power cable communications unit is further configured to transmit the response information to the interface unit; and the interface unit is further configured to transmit the response information to the BBU.

In a third possible implementation manner of the fifth aspect of the embodiments of the present disclosure, when the RRU identifies, according to the control instruction included in the RRU control information, that a to-be-performed operation type is a status information collection operation type, the second power cable communications unit is further configured to demodulate, from the power cable, status feedback information that is transmitted by the direct current power distributor by using the second power input unit and includes status information of the RRU and an address of the BBU, and transmit the status feedback information to the interface unit; and the interface unit is further configured to transmit the status feedback information to the BBU.

With reference to the fifth aspect of the embodiments of the present disclosure or any one of the first to third possible implementation manners of the fifth aspect of the embodiments of the present disclosure, in a fourth possible implementation manner of the fifth aspect of the embodiments of the present disclosure, the interface unit is further configured to receive a cabinet control instruction that is transmitted by the BBU and includes an address of a target cabinet, and transmit the cabinet control instruction to the second power cable communications unit; and the second power cable communications unit is further configured to modulate the cabinet control instruction onto the power cable, and transmit the cabinet control instruction to the direct current power distributor by using the second power input unit, so that the direct current power distributor transmits the cabinet control instruction to the target cabinet by using a power cable, so as to trigger the target cabinet to demodulate the cabinet control instruction from the power cable and after determining that an address of the target cabinet is the same as the address of the target cabinet included in the cabinet control instruction, perform a corresponding control operation in response to the cabinet control instruction.

A sixth aspect of the embodiments of the present disclosure discloses a baseband unit BBU, including a third power input unit, a third power conversion unit, a BBU service unit, and a central monitoring module, where the central monitoring module includes a second control unit and a third power cable communications unit, where the third power cable communications unit and the third power conversion unit are respectively configured to establish a power cable connection to a direct current power supply port of a direct current power distributor by using the third power input unit; the third power cable communications unit is communicatively connected to the second control unit, and the second control unit is communicatively connected to the BBU service unit; the BBU service unit is configured to communicatively connect to an RRU by using a common public radio interface CPRI; the third power conversion unit is configured to perform magnitude conversion on a direct current distributed by the direct current power distributor, and output a converted direct current to the third power cable communications unit, the second control unit, and the BBU service unit; the second control unit is configured to receive RRU control information that is transmitted by the BBU service unit and includes a control instruction, and transmit the RRU control information to the third power cable communications unit; and the third power cable communications unit is configured to modulate the RRU control information onto a power cable, and transmit the RRU control information to the direct current power distributor by using the third power input unit, so as to trigger the direct current power distributor to transmit the RRU control information to the RRU by using a power cable, so that the RRU demodulates the RRU control information from the power cable and performs a corresponding control operation in response to the control instruction.

In a first possible implementation manner of the sixth aspect of the embodiments of the present disclosure, the RRU control information further includes an RRU address, where an address of the RRU is the same as the RRU address included in the RRU control information.

In a second possible implementation manner of the sixth aspect of the embodiments of the present disclosure, when the RRU identifies, according to the control instruction included in the RRU control information, that a to-be-performed operation type is an operation type performed by an RRU service unit, the third power cable communications unit is further configured to demodulate, from the power cable, response information that is transmitted by the direct current power distributor by using the third power input unit and includes an RRU service unit control result and an address of the BBU; or when the RRU identifies, according to the control instruction included in the RRU control information, that a to-be-performed operation type is a power operation type, the third power cable communications unit is further configured to demodulate, from the power cable, response information that is transmitted by the direct current power distributor by using the third power input unit and includes an RRU power control result and an address of the BBU; and the third power cable communications unit is further configured to transmit the response information to the second control unit; and the second control unit is further configured to transmit the response information to the BBU service unit.

In a third possible implementation manner of the sixth aspect of the embodiments of the present disclosure, when the RRU identifies, according to the control instruction included in the RRU control information, that a to-be-performed operation type is a status information collection operation type, the third power cable communications unit is further configured to demodulate, from the power cable, status feedback information that is transmitted by the direct current power distributor by using the third power input unit and includes status information of the RRU and an address of the BBU, and transmit the status feedback information to the second control unit; and the second control unit is further configured to transmit the status feedback information to the BBU service unit.

With reference to the sixth aspect of the embodiments of the present disclosure or any one of the first to third possible implementation manners of the sixth aspect of the embodiments of the present disclosure, in a fourth possible implementation manner of the sixth aspect of the embodiments of the present disclosure, the second control unit is further configured to receive a cabinet control instruction that is transmitted by the BBU service unit and includes an address of a target cabinet, and transmit the cabinet control instruction to the third power cable communications unit; and the third power cable communications unit is further configured to modulate the cabinet control instruction onto the power cable, and transmit the cabinet control instruction to the direct current power distributor by using the third power input unit, so that the direct current power distributor transmits the cabinet control instruction to the target cabinet by using a power cable, so as to trigger the target cabinet to demodulate the cabinet control instruction from the power cable and after determining that an address of the target cabinet is the same as the address of the target cabinet included in the cabinet control instruction, perform a corresponding control operation in response to the cabinet control instruction.

A seventh aspect of the embodiments of the present disclosure discloses a method for controlling a radio base station, including: demodulating, by a first power cable communications unit of an RRU, from a power cable, RRU control information that is transmitted by a direct current power distributor by using a first power input unit of the RRU and includes a control instruction; transmitting, by the first power cable communications unit of the RRU, the demodulated RRU control information to a first control unit of the RRU; identifying, by the first control unit of the RRU, a to-be-performed operation type according to the control instruction included in the RRU control information, where the operation type is any one of an operation type performed by an RRU service unit, a power operation type, and a status information collection operation type; and when the operation type is the operation type performed by the RRU service unit, transmitting, by the first control unit of the RRU, the control instruction to the RRU service unit of the RRU, so as to trigger the RRU service unit to perform a corresponding control operation.

In a first possible implementation manner of the seventh aspect of the embodiments of the present disclosure, the method further includes: when the operation type is the power operation type, transmitting, by the first control unit of the RRU, the control instruction to a first power conversion unit of the RRU, so as to trigger the first power conversion unit of the RRU to perform a corresponding power control operation in response to the control instruction, where the power control operation includes a power-on or power-off control operation.

With reference to the seventh aspect of the embodiments of the present disclosure or the first possible implementation manner of the seventh aspect of the embodiments of the present disclosure, in a second possible implementation manner of the seventh aspect of the embodiments of the present disclosure, the method further includes: when the operation type is the status information collection operation type, transmitting, by the first control unit of the RRU, the control instruction to a first monitoring and collecting unit of the RRU, so as to trigger the first monitoring and collecting unit of the RRU to collect status information of the RRU, where the status information of the RRU includes status information of the RRU service unit of the RRU.

With reference to the second possible implementation manner of the seventh aspect of the embodiments of the present disclosure, in a third possible implementation manner of the seventh aspect of the embodiments of the present disclosure, the RRU control information further includes an RRU address, where the RRU address included in the RRU control information is the same as an address of the RRU to which the first power cable communications unit belongs.

With reference to the third possible implementation manner of the seventh aspect of the embodiments of the present disclosure, in a fourth possible implementation manner of the seventh aspect of the embodiments of the present disclosure, the method further includes: when the operation type is the operation type performed by the RRU service unit, receiving, by the first control unit of the RRU, an RRU service unit control result transmitted by the RRU service unit, adding the RRU service unit control result and an address of a BBU to response information, and transmitting the response information to the first power cable communications unit of the RRU; or when the operation type is the power operation type, receiving, by the first control unit of the RRU, an RRU power control result transmitted by the first power conversion unit of the RRU, adding the RRU power control result and an address of a BBU to response information, and transmitting the response information to the first power cable communications unit of the RRU; and modulating, by the first power cable communications unit of the RRU, the response information onto the power cable, and transmitting the response information to the direct current power distributor by using the first power input unit of the RRU, so as to trigger the direct current power distributor to transmit the response information to a central monitoring module by using a power cable, so that the central monitoring module demodulates the response information from the power cable and transmits the response information to the BBU; or so as to trigger the direct current power distributor to transmit the response information to the BBU by using a power cable, so that the BBU demodulates the response information from the power cable and transmits the response information to a BBU service unit of the BBU.

With reference to the third possible implementation manner of the seventh aspect of the embodiments of the present disclosure, in a fifth possible implementation manner of the seventh aspect of the embodiments of the present disclosure, the method further includes: when the operation type is the status information collection operation type, receiving, by the first control unit of the RRU, the status information of the RRU that is transmitted by the first monitoring and collecting unit of the RRU, adding the status information of the RRU and an address of a BBU to status feedback information, and transmitting the status feedback information to the first power cable communications unit of the RRU; and modulating, by the first power cable communications unit of the RRU, the status feedback information onto the power cable, and transmitting the status feedback information to the direct current power distributor by using the first power input unit of the RRU, so as to trigger the direct current power distributor to transmit the status feedback information to a central monitoring module by using a power cable, so that the central monitoring module demodulates the status feedback information from the power cable and transmits the status feedback information to the BBU; or so as to trigger the direct current power distributor to transmit the status feedback information to the BBU by using a power cable, so that the BBU demodulates the status feedback information from the power cable and transmits the status feedback information to a BBU service unit of the BBU.

With reference to the third possible implementation manner of the seventh aspect of the embodiments of the present disclosure, in a sixth possible implementation manner of the seventh aspect of the embodiments of the present disclosure, the method further includes: receiving, by the RRU service unit of the RRU by using a CPRI unit of the RRU, RRU control information that is transmitted by a BBU and includes an address of a target RRU, and transmitting the RRU control information to the first control unit of the RRU, where the address of the target RRU is not the same as the address of the RRU; transmitting, by the first control unit of the RRU, the RRU control information to the first power cable communications unit of the RRU; and modulating, by the first power cable communications unit of the RRU, the RRU control information onto the power cable, and transmitting the RRU control information to the direct current power distributor by using the first power input unit of the RRU, so as to trigger the direct current power distributor to transmit the RRU control information to a target RRU by using a power cable, to perform a corresponding control operation.

With reference to the third possible implementation manner of the seventh aspect of the embodiments of the present disclosure, in a seventh possible implementation manner of the seventh aspect of the embodiments of the present disclosure, the method further includes: receiving, by the RRU service unit of the RRU by using a CPRI unit of the RRU, a cabinet control instruction that is transmitted by a BBU and includes an address of a target cabinet, and transmitting the cabinet control instruction to the first control unit of the RRU; transmitting, by the first control unit of the RRU, the cabinet control instruction to the first power cable communications unit of the RRU; and modulating, by the first power cable communications unit, the cabinet control instruction onto the power cable, and transmitting the cabinet control instruction to the direct current power distributor by using the first power input unit of the RRU, so as to trigger the direct current power distributor to transmit the cabinet control instruction to the target cabinet by using a power cable, so as to trigger the target cabinet to demodulate the cabinet control instruction from the power cable and after determining that an address of the target cabinet is the same as the address of the target cabinet included in the cabinet control instruction, perform a corresponding control operation in response to the cabinet control instruction.

An eighth aspect of the embodiments of the present disclosure discloses a method for controlling a radio base station, including: receiving, by a central monitoring module, RRU control information that is transmitted by a BBU and includes a control instruction; and modulating, by the central monitoring module, the RRU control information onto a power cable, and transmitting the RRU control information to a direct current power distributor, so as to trigger the direct current power distributor to transmit the RRU control information to an RRU by using a power cable, so that the RRU demodulates the RRU control information from the power cable and performs a corresponding control operation in response to the control instruction.

In a first possible implementation manner of the eighth aspect of the embodiments of the present disclosure, the method further includes: when the RRU identifies, according to the control instruction included in the RRU control information, that a to-be-performed operation type is an operation type performed by an RRU service unit, demodulating, by the central monitoring module, from the power cable, response information that is transmitted by the direct current power distributor and includes an RRU service unit control result and an address of the BBU, and transmitting the response information to the BBU; or when the RRU identifies, according to the control instruction included in the RRU control information, that a to-be-performed operation type is a power operation type, demodulating, by the central monitoring module, from the power cable, response information that is transmitted by the direct current power distributor and includes an RRU power control result and an address of the BBU, and transmitting the response information to the BBU.

In a second possible implementation manner of the eighth aspect of the embodiments of the present disclosure, the method further includes: when the RRU identifies, according to the control instruction included in the RRU control information, that a to-be-performed operation type is a status information collection operation type, demodulating, by the central monitoring module, from the power cable, status feedback information that is transmitted by the direct current power distributor and includes status information of the RRU and an address of the BBU, and transmitting the status feedback information to the BBU.

With reference to the eighth aspect of the embodiments of the present disclosure or the first or second possible implementation manner of the eighth aspect of the embodiments of the present disclosure, in a third possible implementation manner of the eighth aspect of the embodiments of the present disclosure, the method further includes: receiving, by the central monitoring module, a cabinet control instruction that is transmitted by the BBU and includes an address of a target cabinet, modulating the cabinet control instruction onto the power cable, and transmitting the cabinet control instruction to the direct current power distributor, so that the direct current power distributor transmits the cabinet control instruction to the target cabinet by using a power cable, so as to trigger the target cabinet to demodulate the cabinet control instruction from the power cable and after determining that an address of the target cabinet is the same as the address of the target cabinet included in the cabinet control instruction, perform a corresponding control operation in response to the cabinet control instruction.

A ninth aspect of the embodiments of the present disclosure discloses a method for controlling a radio base station, including: transmitting, by a BBU service unit of a BBU, RRU control information including a control instruction to a second control unit of the BBU; receiving, by the second control unit of the BBU, the RRU control information transmitted by the BBU service unit, and transmitting the RRU control information to a third power cable communications unit of the BBU; and modulating, by the third power cable communications unit of the BBU, the RRU control information onto a power cable, and transmitting the RRU control information to a direct current power distributor by using a third power input unit of the BBU, so as to trigger the direct current power distributor to transmit the RRU control information to an RRU by using a power cable, so that the RRU demodulates the RRU control information from the power cable and performs a corresponding control operation in response to the control instruction.

In a first possible implementation manner of the ninth aspect of the embodiments of the present disclosure, the method further includes: when the RRU identifies, according to the control instruction included in the RRU control information, that a to-be-performed operation type is an operation type performed by an RRU service unit, demodulating, by the third power cable communications unit, from the power cable, response information that is transmitted by the direct current power distributor by using the third power input unit of the BBU and includes an RRU service unit control result and an address of the BBU, and transmitting the response information to the second control unit of the BBU; or when the RRU identifies, according to the control instruction included in the RRU control information, that a to-be-performed operation type is a power operation type, demodulating, by the third power cable communications unit of the BBU, from the power cable, response information that is transmitted by the direct current power distributor by using the third power input unit of the BBU and includes an RRU power control result and an address of the BBU, and transmitting the response information to the second control unit of the BBU; and transmitting, by the second control unit of the BBU, the response information to the BBU service unit of the BBU.

In a second possible implementation manner of the ninth aspect of the embodiments of the present disclosure, the method further includes: when the RRU identifies, according to the control instruction included in the RRU control information, that a to-be-performed operation type is a status information collection operation type, demodulating, by the third power cable communications unit, from the power cable, status feedback information that is transmitted by the direct current power distributor by using the third power input unit and includes status information of the RRU and an address of the BBU, and transmitting the status feedback information to the second control unit of the BBU; and transmitting, by the second control unit of the BBU, the status feedback information to the BBU service unit of the BBU.

With reference to the ninth aspect of the embodiments of the present disclosure or the first or second possible implementation manner of the ninth aspect of the embodiments of the present disclosure, in a third possible implementation manner of the ninth aspect of the embodiments of the present disclosure, the method further includes: transmitting, by the BBU service unit of the BBU, a cabinet control instruction including an address of a target cabinet to the second control unit of the BBU; receiving, by the second control unit of the BBU, the cabinet control instruction transmitted by the BBU service unit of the BBU, and transmitting the cabinet control instruction to the third power cable communications unit of the BBU; and modulating, by the third power cable communications unit of the BBU, the cabinet control instruction onto the power cable, and transmitting the cabinet control instruction to the direct current power distributor by using the third power input unit of the BBU, so that the direct current power distributor transmits the cabinet control instruction to the target cabinet by using a power cable, so as to trigger the target cabinet to demodulate the cabinet control instruction from the power cable and after determining that an address of the target cabinet is the same as the address of the target cabinet included in the cabinet control instruction, perform a corresponding control operation in response to the cabinet control instruction.

A tenth aspect of the embodiments of the present disclosure discloses a method for controlling a radio base station, including: receiving, by the central monitoring module, a cabinet control instruction that is transmitted by a BBU and includes an address of a target cabinet; and modulating, by the central monitoring module, the cabinet control instruction onto a power cable, and transmitting the cabinet control instruction to a direct current power distributor, so that the direct current power distributor transmits the cabinet control instruction to the target cabinet by using a power cable, so as to trigger the target cabinet to demodulate the cabinet control instruction from the power cable and after determining that an address of the target cabinet is the same as the address of the target cabinet included in the cabinet control instruction, perform a corresponding control operation in response to the cabinet control instruction.

An eleventh aspect of the embodiments of the present disclosure discloses a method for controlling a radio base station, including: transmitting, by a BBU service unit of a BBU, a cabinet control instruction including an address of a target cabinet to a second control unit of the BBU; receiving, by the second control unit of the BBU, the cabinet control instruction transmitted by the BBU service unit of the BBU, and transmitting the cabinet control instruction to a third power cable communications unit of the BBU; and modulating, by the third power cable communications unit of the BBU, the cabinet control instruction onto a power cable, and transmitting the cabinet control instruction to a direct current power distributor by using a third power input unit of the BBU, so that the direct current power distributor transmits the cabinet control instruction to the target cabinet by using a power cable, so as to trigger the target cabinet to demodulate the cabinet control instruction from the power cable and after determining that an address of the target cabinet is the same as the address of the target cabinet included in the cabinet control instruction, perform a corresponding control operation in response to the cabinet control instruction.

In the embodiments of the present disclosure, an out-of-band emergency channel based on a power cable can be established between a BBU and an RRU, so that even if a unique communications interface CPRI between the BBU and the RRU is abnormal, the BBU can still effectively control the RRU by using the out-of-band emergency channel. In addition, for some types of sites in which multiple RRUs exist (for example, BBU Cloud), out-of-band emergency channels based on power cables can also be established among the multiple RRUs, so that even if a unique communications interface CPRI between a BBU and a certain target RRU is abnormal, the BBU can still effectively control the target RRU by using an out-of-band emergency channel between any RRU (a unique communications interface CPRI of the RRU is normal) and the target RRU. In the embodiments of the present disclosure, dispatching a person to a site for maintenance can be avoided, maintenance costs can be reduced, and a service interruption time of an RRU can also be shortened greatly.

BRIEF DESCRIPTION OF DRAWINGS

To describe the technical solutions in the embodiments of the present disclosure more clearly, the following briefly introduces the accompanying drawings that describe the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Embodiments of the present disclosure disclose a system and method for controlling a radio base station, and a related device, so that a BBU can effectively control an RRU. For better understanding the embodiments of the present disclosure, the following first describes an application scenario of the embodiments of the present disclosure.

Figure 1:
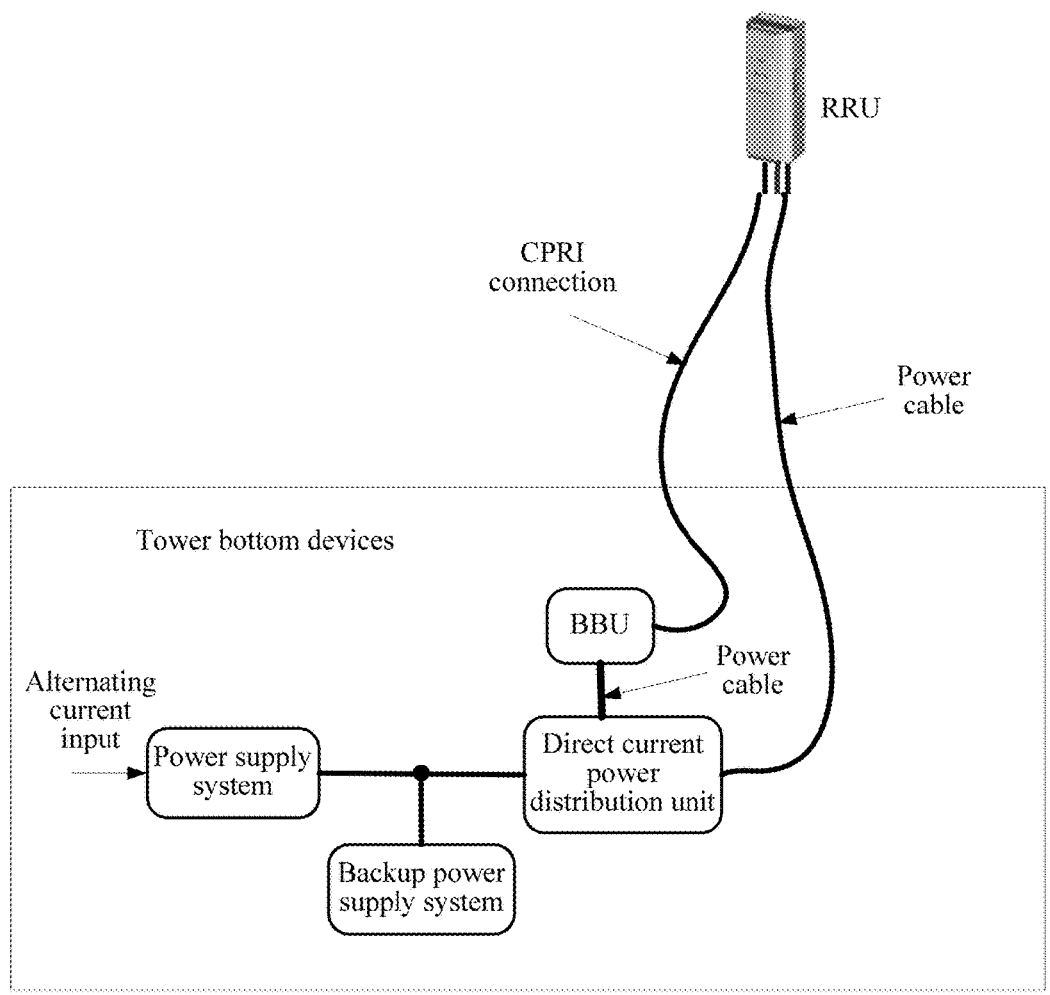
FIG. 1 is a schematic diagram of an application scenario according to an embodiment of the present disclosure.

FIG. 1 is a schematic diagram of an application scenario according to an embodiment of the present disclosure. In the application scenario shown in FIG. 1, a BBU, a power supply system, a backup power supply system, and a direct current power distributor are installed at the tower bottom as tower bottom devices for ease of manual maintenance; and an RRU is installed at the tower top close to an antenna to reduce a feeder loss. An input port of the direct current power distributor is connected to direct current ports of the power supply system and the backup power supply system; the BBU and the RRU are respectively connected to different direct current power supply ports of the direct current power distributor by using power cables; the power supply system is generally an AC/DC power supply system, and is configured to convert input alternating currents into a direct current (such as −48 V) and output the direct current; the direct current power distributor is configured to distribute the direct current that is output by the power supply system, to the BBU and the RRU to supply power (such as −48 V); the backup power supply system is configured to store the direct current that is output by the power supply system, and output the direct current to the direct current power distributor in a case of an alternating current power outage, so that the direct current power distributor distributes the direct current that is output by the backup power supply system, to the BBU and the RRU to supply power; the BBU and the RRU are connected by using a CPRI, the BBU exchanges service data with the RRU by using the CPRI, and the BBU can perform control (such as automatic reset, fault query, diagnosis, and fault recovery) on the RRU (mainly an RRU service unit) by using the CPRI. In an actual application, in the application scenario shown in FIG. 1, the BBU controls the RRU depending on the CPRI between the BBU and the RRU. However, when the CPRI between the BBU and the RRU is abnormal, the BBU loses the capability of controlling the RRU.

Figure 2:
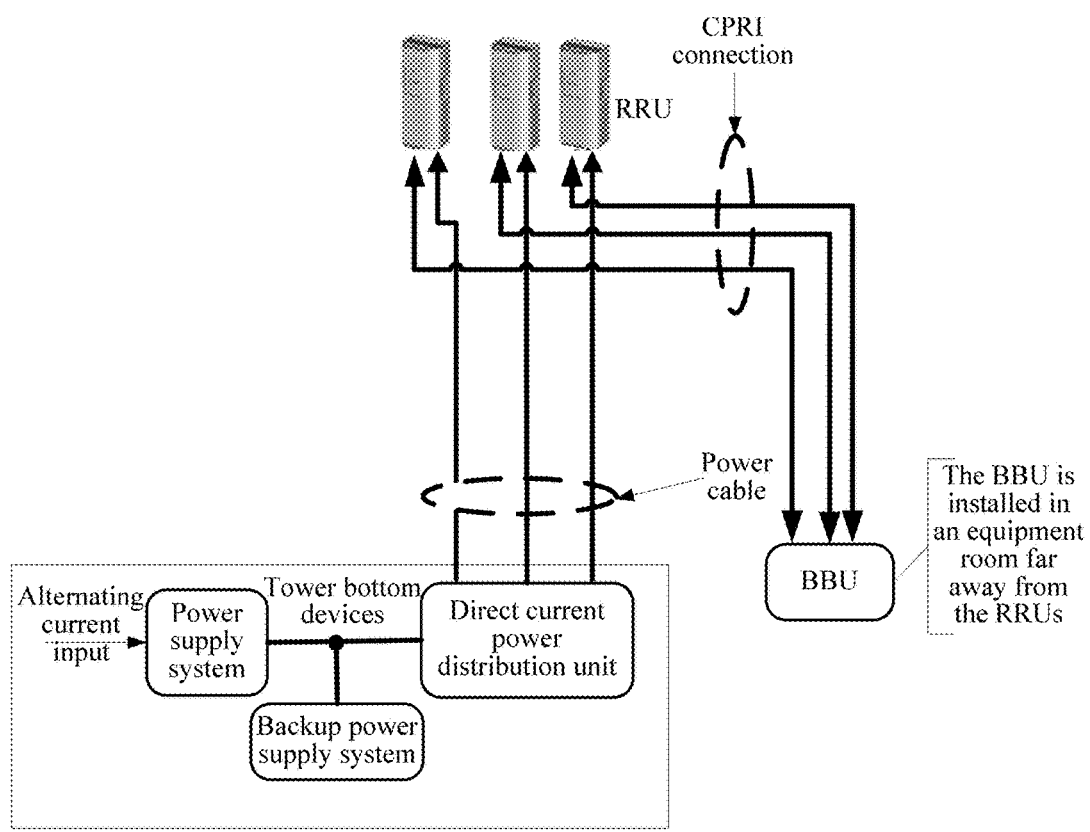
FIG. 2 is a schematic diagram of another application scenario according to an embodiment of the present disclosure.

FIG. 2 is a schematic diagram of another application scenario according to an embodiment of the present disclosure. In the application scenario shown in FIG. 2, a power supply system, a backup power supply system, and a direct current power distributor are installed at the tower bottom as tower bottom devices for ease of manual maintenance; multiple RRUs are installed at the tower top close to an antenna to reduce a feeder loss; a BBU is installed in an equipment room far away from the RRUs (generally, installed in a central equipment room over 1 km away from the RRUs); power is supplied to the BBU without using the direct current power distributor, and the BBU may have a built-in direct current power supply module, or power may be supplied by using another direct current power supply device. An input port of the direct current power distributor is connected to direct current ports of the power supply system and the backup power supply system; the multiple RRUs are respectively connected to different direct current power supply ports of the direct current power distributor by using power cables; the power supply system is generally an AC/DC power supply system, and is configured to convert input alternating currents into a direct current (such as −48 V) and output the direct current; the direct current power distributor is configured to distribute the direct current that is output by the power supply system, to the multiple RRUs to supply power (such as −48 V); the backup power supply system is configured to store the direct current that is output by the power supply system, and output the direct current to the direct current power distributor in a case of an alternating current power outage, so that the direct current power distributor distributes the direct current that is output by the backup power supply system, to the multiple RRUs to supply power; the BBU and each RRU are connected by using a CPRI, the BBU exchanges service data with each RRU by using the CPRI, and the BBU can perform control (such as automatic reset, fault query, diagnosis, and fault recovery) on each RRU (mainly an RRU service unit) by using the CPRI. In an actual application, in the application scenario shown in FIG. 2, the BBU controls a target RRU depending on a CPRI between the BBU and the target RRU. However, when the CPRI between the BBU and the target RRU is abnormal, the BBU loses the capability of controlling the target RRU.

Figure 3:
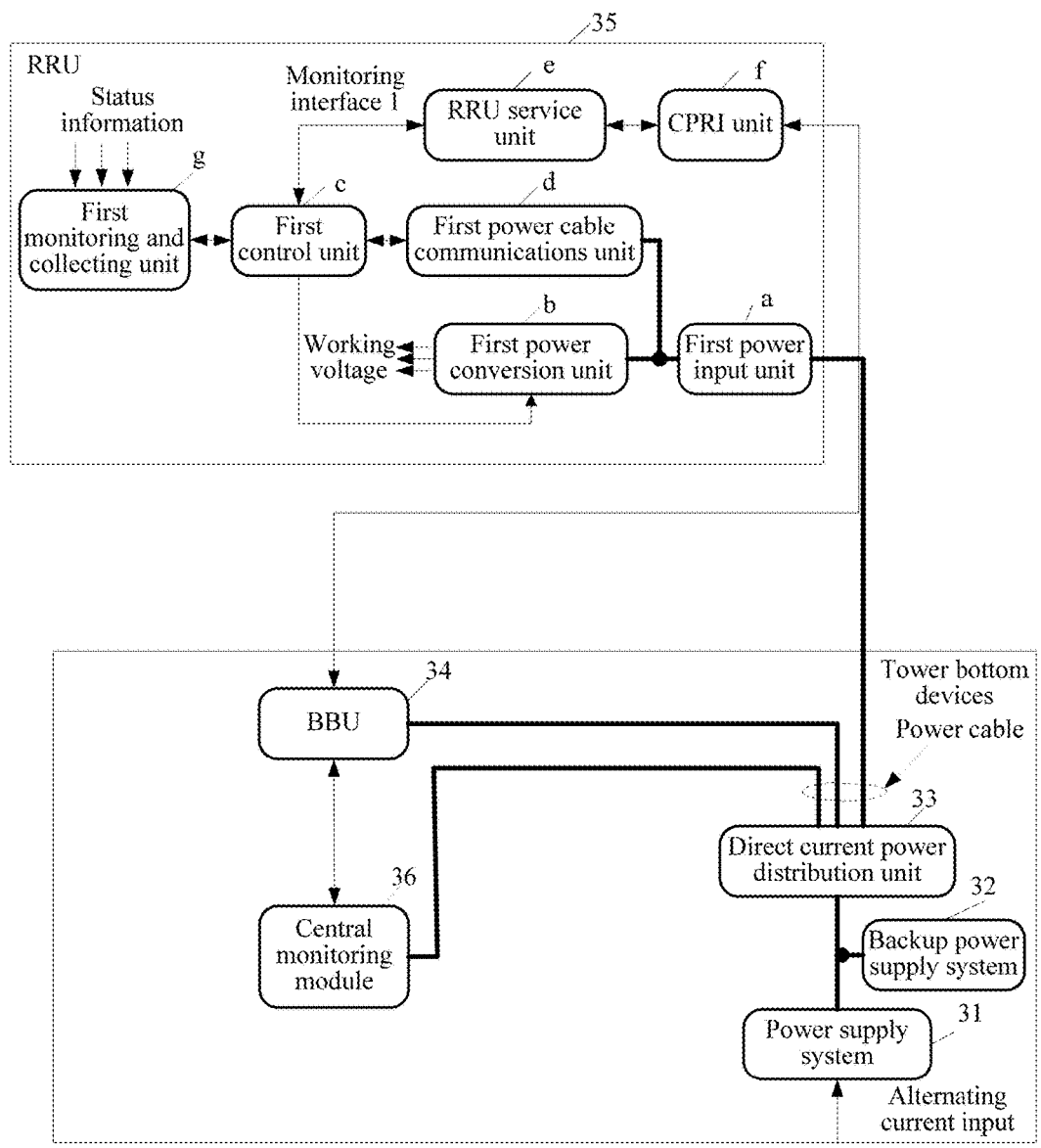
FIG. 3 is a schematic structural diagram of a system for controlling a radio base station according to an embodiment of the present disclosure.

In view of the disadvantage that exists in the application scenario shown in FIG. 1, an embodiment of the present disclosure discloses a system for controlling a radio base station, where a schematic structural diagram of the system for controlling a radio base station is shown in FIG. 3. The system for controlling a radio base station shown in FIG. 3 may include a power supply system 31, a backup power supply system 32, a direct current power distributor 33, a BBU 34, and an RRU 35. The power supply system 31, the backup power supply system 32, the direct current power distributor 33, and the BBU 34 may be installed at the tower bottom as tower bottom devices for ease of manual maintenance; the RRU 35 may be installed at the tower top close to an antenna to reduce a feeder loss. The BBU 34 and the RRU 35 are connected by using a CPRI; an input port of the direct current power distributor 33 is connected to direct current ports of the power supply system 31 and the backup power supply system 32; the power supply system 31 is generally an AC/DC power supply system, and the power supply system 31 is configured to convert input alternating currents into a direct current (such as −48 V) and output the direct current to the backup power supply system 32 and the direct current power distributor 33; the backup power supply system 32 is generally a lead-acid battery; the direct current port of the backup power supply system 32 is connected to the input port of the direct current power distributor 33, and is also connected to the direct current port of the power supply system 31; the backup power supply system 32 is configured to store the direct current that is output by the power supply system 31, and output the direct current to the direct current power distributor 33 in a case of an alternating current power outage, so that the direct current power distributor 33 may distribute the direct current (such as −48 V) by using direct current power supply ports, to the BBU 34 and the RRU 35 to supply power.

The system for controlling a radio base station shown in FIG. 3 may further include a central monitoring module 36. The central monitoring module 36 may also be installed at the tower bottom as a tower bottom device for ease of manual maintenance; the central monitoring module 36 may be deployed independently of the BBU 34. The central monitoring module 36 is communicatively connected to the BBU 34 and is connected to a direct current power supply port of the direct current power distributor 33 by using a power cable; the central monitoring module 36 is configured to receive RRU control information that is transmitted by the BBU 34 (mainly a BBU service unit) and includes a control instruction, modulate the RRU control information onto the power cable, and transmit the RRU control information to the direct current power distributor 33; the direct current power distributor 33 is configured to transmit the RRU control information to the RRU 35 by using a power cable; and the RRU 35 is configured to demodulate, from the power cable, the RRU control information including the control instruction, and perform a corresponding control operation in response to the control instruction.

In an embodiment, in the system for controlling a radio base station shown in FIG. 3, the RRU 35 may include a first power input unit a, a first power conversion unit b, a first control unit c, a first power cable communications unit d, an RRU service unit e, and a CPRI unit f, where the first power conversion unit b and the first power cable communications unit d respectively establish a power cable connection to the direct current power supply port of the direct current power distributor 33 by using the first power input unit a. That is, by using the first power input unit a, not only a power cable connection may be implemented between the first power conversion unit b and the direct current power supply port of the direct current power distributor 33, but also a power cable connection may be implemented between the first power cable communications unit d and the direct current power supply port of the direct current power distributor 33. In an embodiment, the first power input unit a not only has a function of implementing a power cable connection between the first power conversion unit b and the direct current power supply port of the direct current power distributor 33 and a power cable connection between the first power cable communications unit d and the direct current power supply port of the direct current power distributor 33 respectively, but also has functions such as lightning protection and overvoltage protection.

The first power conversion unit b is configured to perform magnitude conversion on a direct current distributed by the direct current power distributor 33, and output a converted direct current to the first power cable communications unit d (such as 3.3 V). In an embodiment, the first power conversion unit b may further perform magnitude conversion on a direct current distributed by the direct current power distributor 33, and output a converted direct current to units such as the RRU service unit e and the first control unit c in the RRU 35 to supply power.

The first control unit c is communicatively connected to the first power cable communications unit d and the RRU service unit e; the RRU service unit e is communicatively connected to the CPRI unit f, and the CPRI unit f is configured to communicatively connect to the BBU 34. In an embodiment, the first control unit c may be communicatively connected to an interface of the first power cable communications unit d such as a universal asynchronous receiver/transmitter (UART) interface or a serial peripheral interface (SPI) interface, and the first control unit c may be communicatively connected to the RRU service unit e by using a monitoring interface 1.

The direct current power distributor 33 may receive, by using the direct current power supply port connected to the central monitoring module 36, the RRU control information that is modulated by the central monitoring module 36 onto the power cable for transmission, and the direct current power distributor 33 may transmit the RRU control information to the RRU 35 by using the direct current power supply port connected to the first power input unit a of the RRU 35.

The first power cable communications unit d of the RRU 35 is configured to demodulate, from the power cable, the RRU control information including the control instruction, and transmit the demodulated RRU control information to the first control unit c of the RRU 35; the first control unit c of the RRU 35 is configured to identify a to-be-performed operation type according to the control instruction, where the operation type is any one of an operation type performed by the RRU service unit e, a power operation type, and a status information collection operation type; and when the operation type is the operation type performed by the RRU service unit e, the first control unit c of the RRU 35 may transmit the control instruction to the RRU service unit e of the RRU 35, so as to trigger the RRU service unit e of the RRU 35 to perform a corresponding control operation. For example, the corresponding control operation performed by the RRU service unit e may include automatic reset, fault query, diagnosis, fault recovery, or the like.

In an optional implementation manner, in the system for controlling a radio base station shown in FIG. 3, the first power conversion unit b of the RRU 35 is communicatively connected to the first control unit c, and correspondingly, the first control unit c is further configured to transmit the control instruction to the first power conversion unit b when the operation type is the power operation type, so as to trigger the first power conversion unit b to perform a corresponding power control operation in response to the control instruction, where the power control operation includes a power-on or power-off control operation. In this optional implementation manner, the BBU 34 may also implement flexible power control on the RRU 35 without using the CPRI unit f of the RRU 35, so that incapability of implementing complete power-off on the RRU 35 by the BBU 34 by using the CPRI unit f can be overcome effectively. This is because the CPRI unit f cannot communicate normally when the BBU 34 implements complete power-off on the RRU 35 by using the CPRI unit f, and in this case, the BBU 34 cannot control the RRU 35 to power on again.

In an optional implementation manner, in the system for controlling a radio base station shown in FIG. 3, the RRU 35 further includes a first monitoring and collecting unit g, where the first monitoring and collecting unit g is communicatively connected to the first control unit c. The first monitoring and collecting unit g is configured to collect status information of the RRU 35 and transmit the status information to the first control unit c, where the status information of the RRU 35 includes status information of the RRU service unit e, such as voltage status information, temperature status information, and output power status information of the RRU service unit e.

In an optional implementation manner, in the system for controlling a radio base station shown in FIG. 3, the first control unit c of the RRU 35 is further configured to transmit the control instruction to the first monitoring and collecting unit g of the RRU 35 when the operation type is the status information collection operation type, so as to trigger the first monitoring and collecting unit g to collect the status information of the RRU 35 and transmit the status information to the first control unit c.

In an optional implementation manner, in the system for controlling a radio base station shown in FIG. 3, the RRU control information may further include an RRU address, where the RRU address included in the RRU control information is the same as an address of the RRU 35 to which the first power cable communications unit d belongs. In an embodiment, after demodulating, from the power cable, the RRU control information including the control instruction and the RRU address, the first power cable communications unit d of the RRU 35 may determine whether the RRU address included in the RRU control information is the same as the address of the RRU 35 to which the first power cable communications unit d belongs; if they are the same, the first power cable communications unit d of the RRU 35 may transmit the demodulated RRU control information to the first control unit c of the RRU 35; on the contrary, if they are not the same, the first power cable communications unit d of the RRU 35 may ignore the RRU control information.

Figure 4:
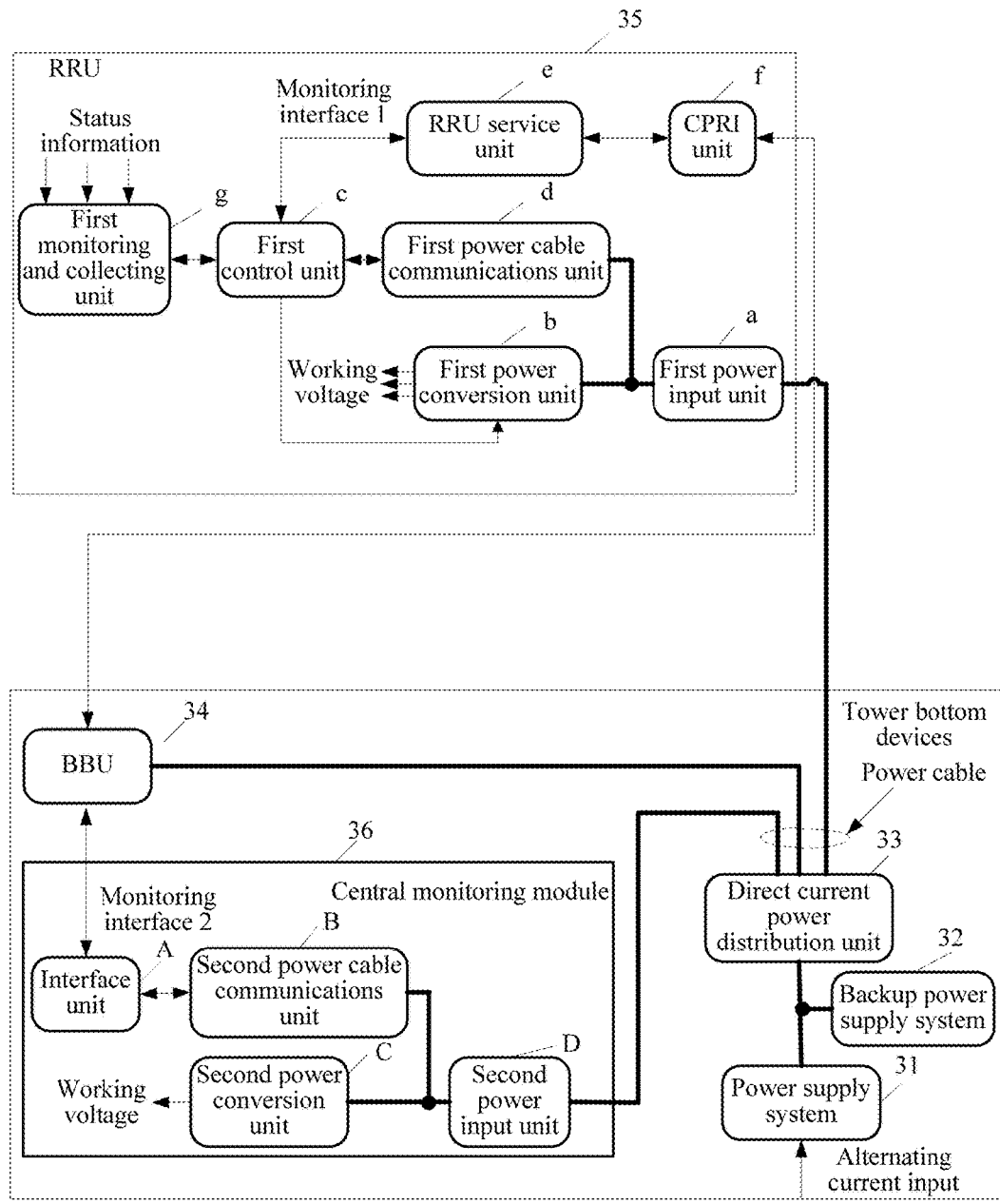
FIG. 4 is a schematic structural diagram of another system for controlling a radio base station according to an embodiment of the present disclosure.

FIG. 4 is a schematic structural diagram of another system for controlling a radio base station that is obtained by optimizing the system for controlling a radio base station shown in FIG. 3 according to an embodiment of the present disclosure. In the system for controlling a radio base station shown in FIG. 4, a central monitoring module 36 is still deployed independently of a BBU 34, and includes an interface unit A, a second power cable communications unit B, a second power conversion unit C, and a second power input unit D, where the second power conversion unit C and the second power cable communications unit B respectively establish a power cable connection to a direct current power supply port of a direct current power distributor 33 by using the second power input unit D. That is, by using the second power input unit D, not only a power cable connection may be implemented between the second power conversion unit C and the direct current power supply port of the direct current power distributor 33, but also a power cable connection may be implemented between the second power cable communications unit B and the direct current power supply port of the direct current power distributor 33. In an embodiment, the second power input unit D not only has a function of implementing a power cable connection between the second power conversion unit C and the direct current power supply port of the direct current power distributor 33 and a power cable connection between the second power cable communications unit B and the direct current power supply port of the direct current power distributor 33 respectively, but also has functions such as lightning protection and overvoltage protection.

The second power conversion unit C is configured to perform magnitude conversion on a direct current distributed by the direct current power distributor 33, and output a converted direct current (such as 3.3 V) to the second power cable communications unit B. Still further, the second power conversion unit C may further perform magnitude conversion on a direct current distributed by the direct current power distributor 33, and output a converted direct current to the interface unit A.

The interface unit A is communicatively connected to the BBU 34 and the second power cable communications unit B. In an embodiment, the interface unit A may be communicatively connected to the BBU 34 by using a monitoring interface 2, and the interface unit A may be communicatively connected to an interface of the second power cable communications unit B such as a UART interface or an SPI. The interface unit A may convert the interface of the second power cable communications unit B such as the UART interface or the SPI into a monitoring interface 2 that may perform communication with the BBU 34, for example, RS485. The interface unit A is configured to receive RRU control information that is transmitted by the BBU 34 and includes a control instruction, and transmit the RRU control information to the second power cable communications unit B; and the second power cable communications unit B is configured to modulate the RRU control information onto a power cable, and transmit the RRU control information to the direct current power distributor 33 by using the second power input unit D. The direct current power distributor 33 may receive, by using the direct current power supply port connected to the second power input unit D, the RRU control information that is modulated by the second power cable communications unit B onto the power cable for transmission, and the direct current power distributor 33 may transmit the RRU control information to an RRU 35 by using a direct current power supply port connected to a first power input unit a of the RRU 35.

A first power cable communications unit d of the RRU 35 is configured to demodulate, from the power cable, the RRU control information including the control instruction, and transmit the demodulated RRU control information to a first control unit c of the RRU 35. The first control unit c of the RRU 35 is configured to identify a to-be-performed operation type according to the control instruction included in the RRU control information. When the operation type is an operation type performed by an RRU service unit e, the first control unit c of the RRU 35 transmits the control instruction to the RRU service unit e of the RRU 35, so as to trigger the RRU service unit e of the RRU 35 to perform a corresponding control operation. For example, the corresponding control operation performed by the RRU service unit e may include automatic reset, fault query, diagnosis, fault recovery, or the like.

In an optional implementation manner, in the system for controlling a radio base station shown in FIG. 4, after the first control unit c of the RRU 35 identifies, according to the control instruction, that the to-be-performed operation type is the operation type performed by the RRU service unit e, and transmits the control instruction to the RRU service unit e of the RRU 35, so as to trigger the RRU service unit e of the RRU 35 to perform the corresponding control operation, the first control unit c of the RRU 35 is further configured to receive an RRU service unit control result transmitted by the RRU service unit e, add the RRU service unit control result and an address of the BBU 34 to response information, and transmit the response information to the first power cable communications unit d; or after the first control unit c of the RRU 35 identifies, according to the control instruction, that the to-be-performed operation type is a power operation type, and transmits the control instruction to a first power conversion unit b of the RRU 35, so as to trigger the first power conversion unit b to perform a corresponding power control operation in response to the control instruction, the first control unit c of the RRU 35 is further configured to receive an RRU power control result transmitted by the first power conversion unit b, add the RRU power control result and an address of the BBU 34 to response information, and transmit the response information to the first power cable communications unit d; and correspondingly, the first power cable communications unit d is further configured to modulate the response information transmitted by the first control unit c of the RRU 35 onto the power cable, and transmit the response information to the direct current power distributor 33 by using the first power input unit a; the direct current power distributor 33 is further configured to transmit the response information to the second power cable communications unit B by using the second power input unit D; the second power cable communications unit B is further configured to demodulate the response information from the power cable, and transmit the response information to the interface unit A; and the interface unit A is further configured to transmit the response information to the BBU 34.

In an optional implementation manner, in the system for controlling a radio base station shown in FIG. 4, after the first control unit c of the RRU 35 identifies, according to the control instruction, that the to-be-performed operation type is a status information collection operation type, and transmits the control instruction to a first monitoring and collecting unit g of the RRU 35, so as to trigger the first monitoring and collecting unit g to collect status information of the RRU 35, the first control unit c is further configured to receive the status information of the RRU 35 that is transmitted by the first monitoring and collecting unit g, add the status information of the RRU 35 and an address of the BBU 34 to status feedback information, and transmit the status feedback information to the first power cable communications unit d; and correspondingly, the first power cable communications unit d is further configured to modulate the status feedback information transmitted by the first control unit c onto the power cable, and transmit the status feedback information to the direct current power distributor 33 by using the first power input unit a; the direct current power distributor 33 is further configured to transmit the status feedback information to the second power cable communications unit B by using the second power input unit D; the second power cable communications unit B is further configured to demodulate the status feedback information from the power cable, and transmit the status feedback information to the interface unit A; and the interface unit A is further configured to transmit the status feedback information to the BBU 34.

In an optional implementation manner, in the system for controlling a radio base station shown in FIG. 4, the RRU control information may further include an RRU address, where the RRU address included in the RRU control information is the same as an address of the RRU 35 to which the first power cable communications unit d belongs. In an embodiment, after demodulating, from the power cable, the RRU control information including the control instruction and the RRU address, the first power cable communications unit d of the RRU 35 may determine whether the RRU address included in the RRU control information is the same as the address of the RRU 35 to which the first power cable communications unit d belongs; if they are the same, the first power cable communications unit d of the RRU 35 may transmit the demodulated RRU control information to the first control unit c of the RRU 35; on the contrary, if they are not the same, the first power cable communications unit d of the RRU 35 may ignore the RRU control information.

Figure 5:
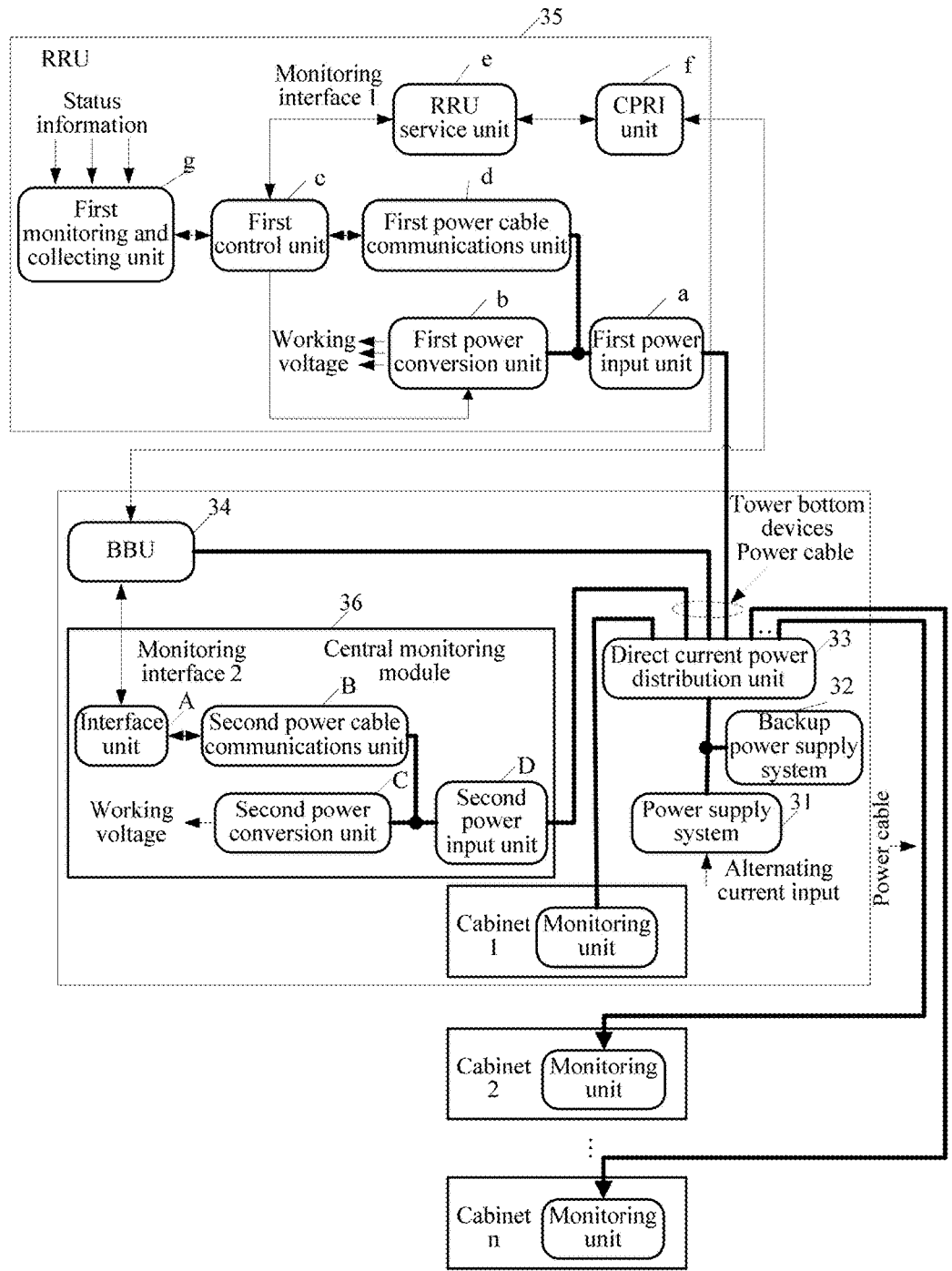
FIG. 5 is a schematic structural diagram of another system for controlling a radio base station according to an embodiment of the present disclosure.

FIG. 5 is a schematic structural diagram of another system for controlling a radio base station that is obtained by optimizing the system for controlling a radio base station shown in FIG. 4 according to an embodiment of the present disclosure. Compared with the system for controlling a radio base station shown in FIG. 4, the system for controlling a radio base station shown in FIG. 5 may further include at least one cabinet, where each cabinet (mainly including a monitoring unit) is connected to a direct current power supply port of a direct current power distributor 33 by using a power cable; in actual deployment, some cabinets (such as a cabinet 1) may be deployed as tower bottom devices together with a BBU 34, a power supply system 31, a backup power supply system 32, the direct current power distributor 33, and the like, but some cabinets (such as a cabinet 2 to a cabinet n) may be deployed in an equipment room far away from an RRU 35.

An interface unit A is further configured to receive a cabinet control instruction that is transmitted by the BBU 34 and includes an address of a target cabinet, and transmit the cabinet control instruction to a second power cable communications unit B; the second power cable communications unit B is further configured to modulate the cabinet control instruction onto a power cable, and transmit the cabinet control instruction to the direct current power distributor 33 by using a second power input unit D; the direct current power distributor 33 is further configured to transmit the cabinet control instruction to the target cabinet by using a power cable; and the target cabinet is configured to demodulate the cabinet control instruction from the power cable and after determining that an address of the target cabinet is the same as the address of the target cabinet included in the cabinet control instruction, perform a corresponding control operation in response to the cabinet control instruction. On the contrary, if the target cabinet determines that the address of the target cabinet is not the same as the address of the target cabinet included in the cabinet control instruction, the target cabinet may ignore the cabinet control instruction.

For example, the interface unit A may receive the cabinet control instruction that is transmitted by the BBU 34 and includes an address of the cabinet 2 (that is, the cabinet 2 is the target cabinet), and transmit the cabinet control instruction to the second power cable communications unit B; the second power cable communications unit B modulates the cabinet control instruction onto the power cable, and transmits the cabinet control instruction to the direct current power distributor 33 by using the second power input unit D; the direct current power distributor 33 transmits the cabinet control instruction to the cabinet 2 (mainly a monitoring unit) by using a power cable; and the cabinet 2 (mainly the monitoring unit) is configured to demodulate the cabinet control instruction from the power cable and after determining that an address of the cabinet 2 is the same as the address of the cabinet 2 included in the cabinet control instruction, perform a corresponding control operation in response to the cabinet control instruction.

In an embodiment, after the cabinet 2 (mainly the monitoring unit) performs the corresponding control operation in response to the cabinet control instruction, the cabinet 2 (mainly the monitoring unit) may add a cabinet control result and an address of the BBU 34 to a cabinet control response message, modulate the cabinet control response message onto the power cable, and transmit the cabinet control response message to the direct current power distributor 33; the direct current power distributor 33 may transmit the cabinet control response message to the second power cable communications unit B by using the second power input unit D; and the second power cable communications unit B may demodulate the cabinet control response message from the power cable and transmit the cabinet control response message to the BBU 34 by using the interface unit A. The corresponding control operation performed by the target cabinet in response to the cabinet control instruction may include control operations on an internal environment, a power supply, a heat dissipation system and the like of the target cabinet.

In the system for controlling a radio base station shown in FIG. 5, if the BBU does not need to be connected to monitoring units of the cabinet 1 to the cabinet n by using monitoring cables, the BBU can control the cabinets by using corresponding power cables. Therefore, monitoring cables between the BBU and the cabinets are saved, and project installation costs and difficulty of a radio base station can be reduced.

Figure 6:
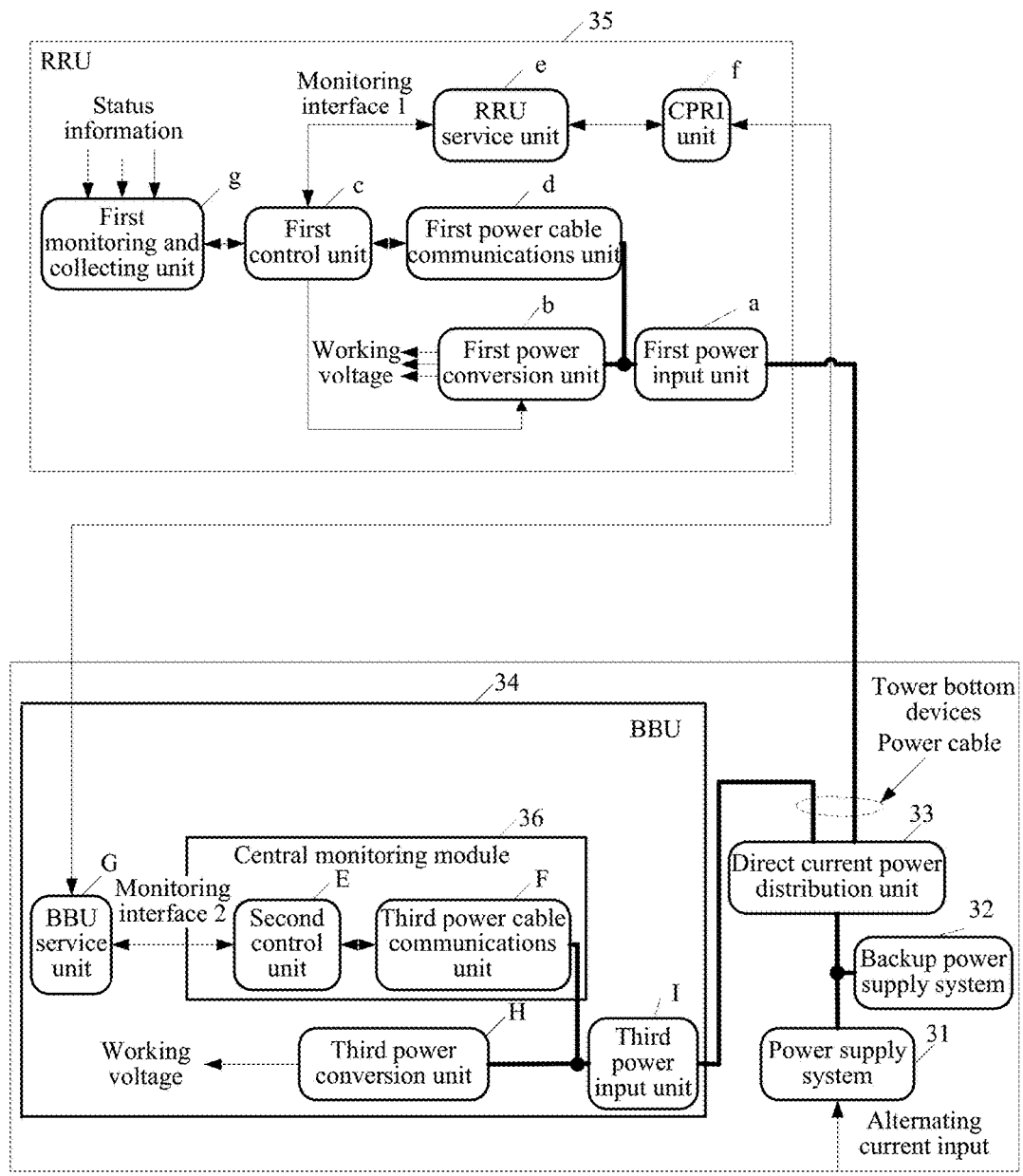
FIG. 6 is a schematic structural diagram of another system for controlling a radio base station according to an embodiment of the present disclosure.

FIG. 6 is a schematic structural diagram of another system for controlling a radio base station that is obtained by optimizing the system for controlling a radio base station shown in FIG. 3 according to an embodiment of the present disclosure. In the system for controlling a radio base station shown in FIG. 6, a central monitoring module 36 may be integrated in a BBU 34. In this case, the central monitoring module 36 may include a second control unit E and a third power cable communications unit F. The BBU 34 may include a BBU service unit G, a third power conversion unit H, and a third power input unit I, and the BBU service unit G is communicatively connected to the second control unit E. For example, the BBU service unit G is communicatively connected to the second control unit E by using a monitoring interface 2. The second control unit E is communicatively connected to the third power cable communications unit F. The third power conversion unit H and the third power cable communications unit F respectively establish a power cable connection to a direct current power supply port of a direct current power distributor 33 by using the third power input unit I. The third power conversion unit H is configured to perform magnitude conversion on a direct current distributed by the direct current power distributor 33, and output a converted direct current to the third power cable communications unit F (such as 3.3 V). Still further, the third power conversion unit H may be further configured to perform magnitude conversion on a direct current distributed by the direct current power distributor 33, and output a converted direct current to units such as the BBU service unit G and the second control unit E in the BBU 34. In an embodiment, the second control unit E and the third power cable communications unit F may also have built-in direct current power supply modules for supplying power separately.

The second control unit E is configured to receive RRU control information that is transmitted by the BBU service unit G and includes a control instruction, and transmit the RRU control information to the third power cable communications unit F; and the third power cable communications unit F is configured to modulate the RRU control information onto a power cable, and transmit the RRU control information to the direct current power distributor 33 by using the third power input unit I. The direct current power distributor 33 may receive, by using the direct current power supply port connected to the third power input unit I, the RRU control information that is modulated by the third power cable communications unit F onto the power cable for transmission, and the direct current power distributor 33 may transmit the RRU control information to an RRU 35 by using a direct current power supply port connected to a first power input unit a of the RRU 35. Correspondingly, a first power cable communications unit d of the RRU 35 is configured to demodulate, from the power cable, the RRU control information including the control instruction, and transmit the demodulated RRU control information to a first control unit c of the RRU 35. The first control unit c of the RRU 35 is configured to identify a to-be-performed operation type according to the control instruction included in the RRU control information. When the operation type is an operation type performed by an RRU service unit e, the first control unit c of the RRU 35 transmits the control instruction to the RRU service unit e of the RRU 35, so as to trigger the RRU service unit e of the RRU 35 to perform a corresponding control operation. For example, the corresponding control operation performed by the RRU service unit e may include automatic reset, fault query, diagnosis, fault recovery, or the like.

In an optional implementation manner, in the system for controlling a radio base station shown in FIG. 6, after the first control unit c of the RRU 35 identifies, according to the control instruction, that the to-be-performed operation type is the operation type performed by the RRU service unit e, and transmits the control instruction to the RRU service unit e of the RRU 35, so as to trigger the RRU service unit e of the RRU 35 to perform the corresponding control operation, the first control unit c of the RRU 35 is further configured to receive an RRU service unit control result transmitted by the RRU service unit e, add the RRU service unit control result and an address of the BBU 34 to response information, and transmit the response information to the first power cable communications unit d; or after the first control unit c of the RRU 35 identifies, according to the control instruction, that the to-be-performed operation type is a power operation type, and transmits the control instruction to a first power conversion unit b of the RRU 35, so as to trigger the first power conversion unit b to perform a corresponding power control operation in response to the control instruction, the first control unit c of the RRU 35 is further configured to receive an RRU power control result transmitted by the first power conversion unit b, add the RRU power control result and an address of the BBU 34 to response information, and transmit the response information to the first power cable communications unit d; and correspondingly, the first power cable communications unit d is further configured to modulate the response information transmitted by the first control unit c of the RRU 35 onto the power cable, and transmit the response information to the direct current power distributor 33 by using the first power input unit a; the direct current power distributor 33 is further configured to transmit the response information to the third power cable communications unit F by using the third power input unit I; the third power cable communications unit F is further configured to demodulate the response information from the power cable, and transmit the response information to the second control unit E; and the second control unit E is further configured to transmit the response information to the BBU service unit G.

In an optional implementation manner, in the system for controlling a radio base station shown in FIG. 6, after the first control unit c of the RRU 35 identifies, according to the control instruction, that the to-be-performed operation type is a status information collection operation type, and transmits the control instruction to a first monitoring and collecting unit g of the RRU 35, so as to trigger the first monitoring and collecting unit g to collect status information of the RRU 35, the first control unit c is further configured to receive the status information of the RRU 35 that is transmitted by the first monitoring and collecting unit g, add the status information of the RRU 35 and an address of the BBU 34 to status feedback information, and transmit the status feedback information to the first power cable communications unit d; and correspondingly, the first power cable communications unit d is further configured to modulate the status feedback information transmitted by the first control unit c onto the power cable, and transmit the status feedback information to the direct current power distributor 33 by using the first power input unit a; the direct current power distributor 33 is further configured to transmit the status feedback information to the third power cable communications unit F by using the third power input unit I; the third power cable communications unit F is further configured to demodulate the status feedback information from the power cable, and transmit the status feedback information to the second control unit E; and the second control unit E is further configured to transmit the status feedback information to the BBU service unit G.

In an optional implementation manner, in the system for controlling a radio base station shown in FIG. 6, the RRU control information may further include an RRU address, where the RRU address included in the RRU control information is the same as an address of the RRU 35 to which the first power cable communications unit d belongs. In an embodiment, after demodulating, from the power cable, the RRU control information including the control instruction and the RRU address, the first power cable communications unit d of the RRU 35 may determine whether the RRU address included in the RRU control information is the same as the address of the RRU 35 to which the first power cable communications unit d belongs; if they are the same, the first power cable communications unit d of the RRU 35 may transmit the demodulated RRU control information to the first control unit c of the RRU 35; on the contrary, if they are not the same, the first power cable communications unit d of the RRU 35 may ignore the RRU control information.

Figure 7:
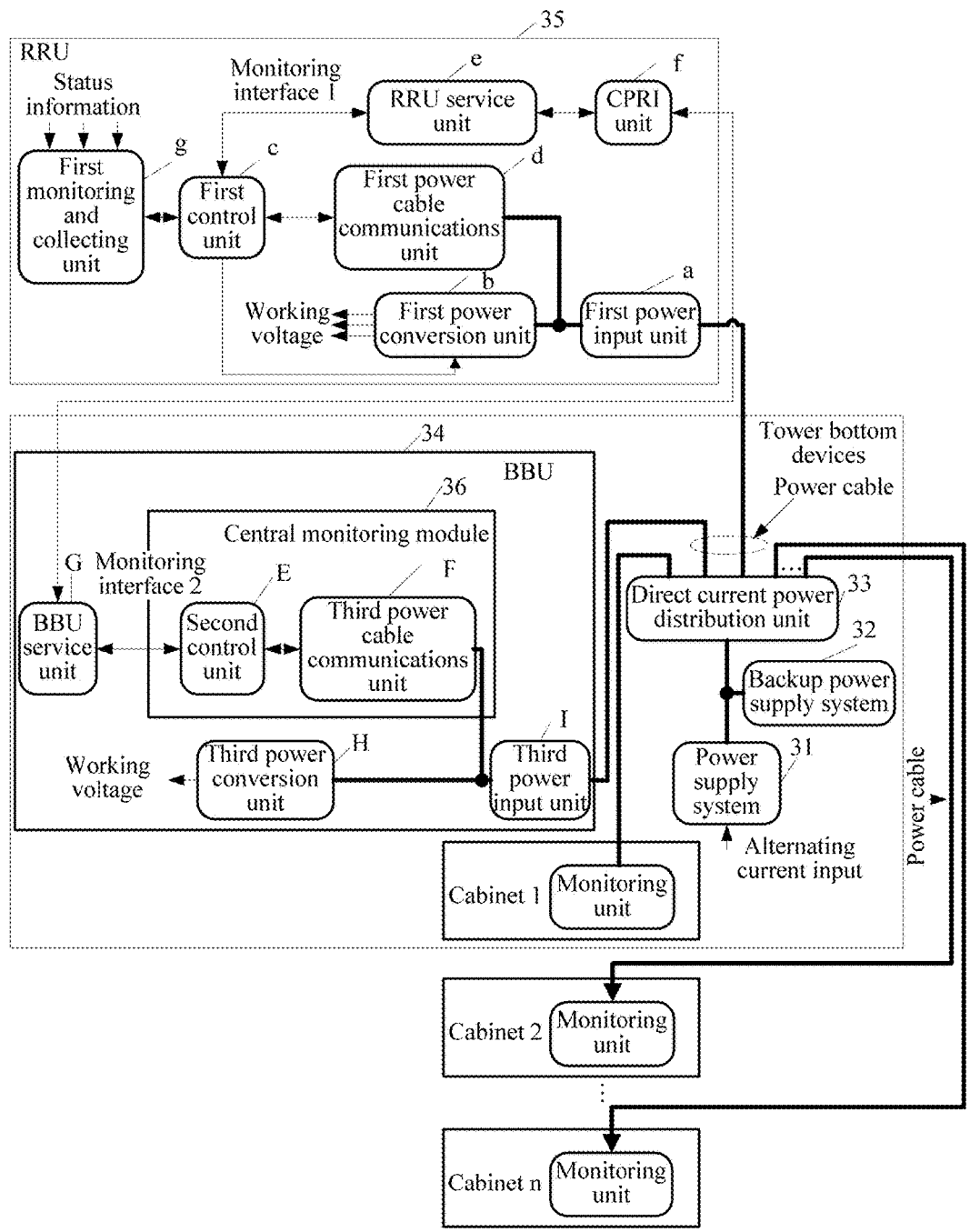
FIG. 7 is a schematic structural diagram of another system for controlling a radio base station according to an embodiment of the present disclosure.

FIG. 7 is a schematic structural diagram of another system for controlling a radio base station that is obtained by optimizing the system for controlling a radio base station shown in FIG. 6 according to an embodiment of the present disclosure. Compared with the system for controlling a radio base station shown in FIG. 6, the system for controlling a radio base station shown in FIG. 7 may further include at least one cabinet, where each cabinet (mainly including a monitoring unit) is connected to a direct current power supply port of a direct current power distributor 33 by using a power cable; in actual deployment, some cabinets (such as a cabinet 1) may be deployed as tower bottom devices together with a BBU 34, a power supply system 31, a backup power supply system 32, and the like, but some cabinets (such as a cabinet 2 to a cabinet n) may be deployed in an equipment room far away from an RRU 35.

A second control unit E is further configured to receive a cabinet control instruction that is transmitted by a BBU service unit G and includes an address of a target cabinet, and transmit the cabinet control instruction to a third power cable communications unit F; the third power cable communications unit F is further configured to modulate the cabinet control instruction onto a power cable, and transmit the cabinet control instruction to the direct current power distributor 33 by using a third power input unit I; the direct current power distributor 33 is further configured to transmit the cabinet control instruction to the target cabinet by using a power cable; and the target cabinet is configured to demodulate the cabinet control instruction from the power cable, and after determining that an address of the target cabinet is the same as the address of the target cabinet included in the cabinet control instruction, perform a corresponding control operation in response to the cabinet control instruction. On the contrary, if the target cabinet determines that the address of the target cabinet is not the same as the address of the target cabinet included in the cabinet control instruction, the target cabinet may ignore the cabinet control instruction.

For example, the second control unit E may receive the cabinet control instruction that is transmitted by the BBU service unit G and includes an address of the cabinet 2 (that is, the cabinet 2 is the target cabinet), and transmit the cabinet control instruction to the third power cable communications unit F; the third power cable communications unit F modulates the cabinet control instruction onto the power cable, and transmits the cabinet control instruction to the direct current power distributor 33 by using the third power input unit I; the direct current power distributor 33 transmits the cabinet control instruction to the cabinet 2 by using a power cable; and the cabinet 2 is configured to demodulate the cabinet control instruction from the power cable and after determining that an address of the cabinet 2 is the same as the address of the cabinet 2 included in the cabinet control instruction, perform a corresponding control operation in response to the cabinet control instruction. In an embodiment, after the cabinet 2 (mainly a monitoring unit) performs the corresponding control operation in response to the cabinet control instruction, the cabinet 2 (mainly the monitoring unit) may add a cabinet control result and an address of the BBU 34 to a cabinet control response message, modulate the cabinet control response message onto the power cable, and transmit the cabinet control response message to the direct current power distributor 33; the direct current power distributor 33 may transmit the cabinet control response message to the third power cable communications unit F by using the third power input unit I; and the third power cable communications unit F may demodulate the cabinet control response message from the power cable and transmit the cabinet control response message to the BBU service unit G by using the second control unit E. The corresponding control operation performed by the target cabinet in response to the cabinet control instruction may include control operations on an internal environment, a power supply, a heat dissipation system and the like of the target cabinet.

In the system for controlling a radio base station shown in FIG. 7, out-of-band emergency channels based on power cables can also be established between cabinets and multiple RRUs. In this way, if the BBU does not need to be connected to monitoring units in the cabinet 1 to the cabinet n by using monitoring cables, the BBU can control the cabinets by using corresponding power cables. Therefore, monitoring cables between the BBU and the cabinets are saved, and project installation costs and difficulty of a radio base station can be reduced.

Figure 8:
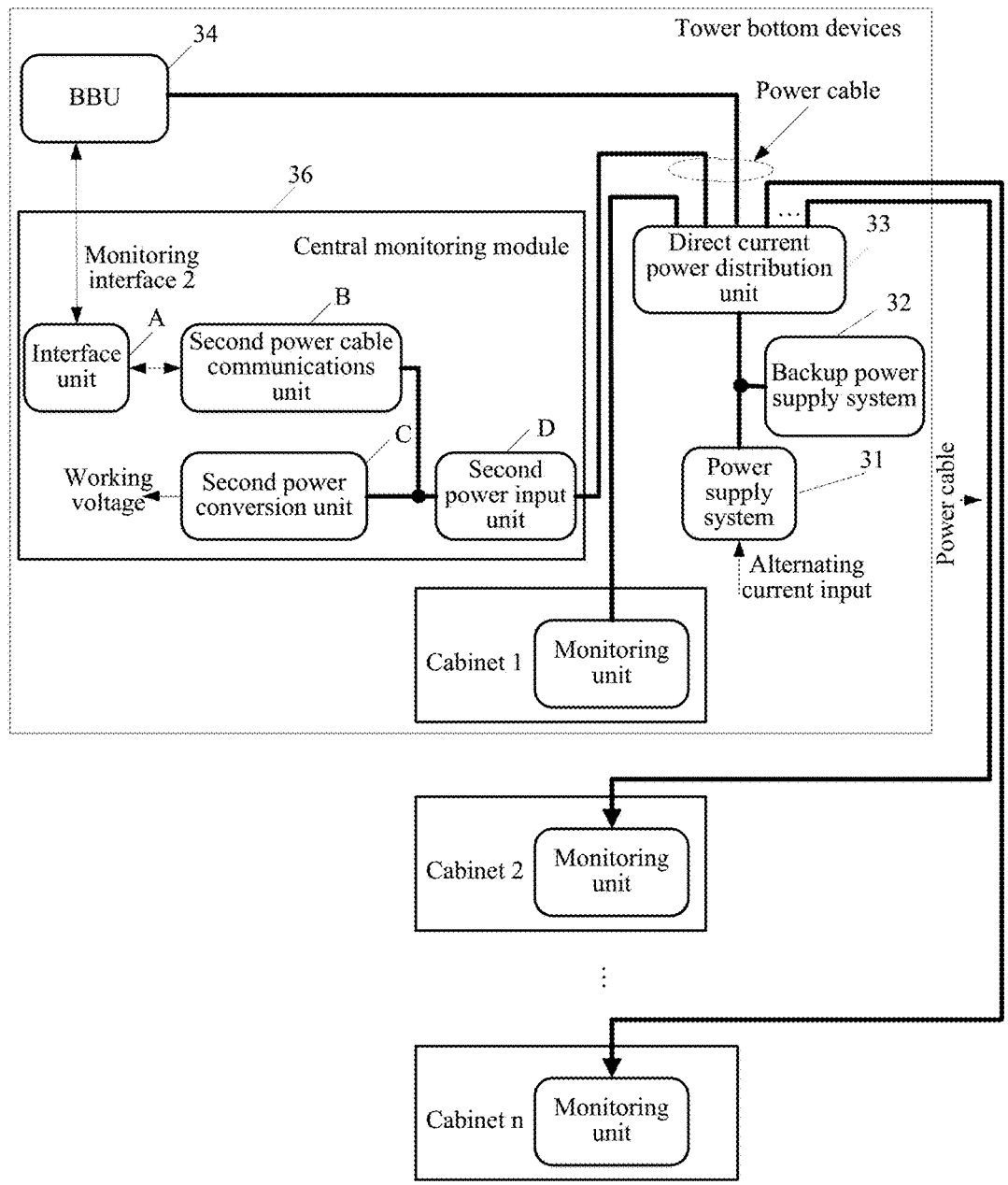
FIG. 8 is a schematic structural diagram of another system for controlling a radio base station according to an embodiment of the present disclosure.

FIG. 8 is a schematic structural diagram of another system for controlling a radio base station according to an embodiment of the present disclosure. The system for controlling a radio base station shown in FIG. 8 includes a power supply system 31, a backup power supply system 32, a direct current power distributor 33, a BBU 34, and at least one cabinet. An input port of the direct current power distributor 33 is connected to direct current ports of the power supply system 31 and the backup power supply system 32; the BBU 34 and the cabinet are respectively connected to direct current power supply ports of the direct current power distributor 33 by using power cables; in actual deployment, some cabinets (such as a cabinet 1) may be deployed as tower bottom devices together with the BBU 34, the power supply system 31, the backup power supply system 32, the direct current power distributor 33, and the like, but some cabinets (such as a cabinet 2 to a cabinet n) may be deployed in an equipment room far away from an RRU 35.

The system for controlling a radio base station shown in FIG. 8 further includes a central monitoring module 36. The central monitoring module 36 is deployed independently of the BBU 34, and includes an interface unit A, a second power cable communications unit B, a second power conversion unit C, and a second power input unit D, where the second power conversion unit C and the second power cable communications unit B respectively establish a power cable connection to a direct current power supply port of the direct current power distributor 33 by using the second power input unit D. That is, by using the second power input unit D, not only a power cable connection may be implemented between the second power conversion unit C and the direct current power supply port of the direct current power distributor 33, but also a power cable connection may be implemented between the second power cable communications unit B and the direct current power supply port of the direct current power distributor 33. In an embodiment, the second power input unit D not only has a function of implementing a power cable connection between the second power conversion unit C and the direct current power supply port of the direct current power distributor 33 and a power cable connection between the second power cable communications unit B and the direct current power supply port of the direct current power distributor 33 respectively, but also has functions such as lightning protection and overvoltage protection.

The interface unit A is configured to receive a cabinet control instruction that is transmitted by the BBU 34 and includes an address of a target cabinet, and transmit the cabinet control instruction to the second power cable communications unit B; the second power cable communications unit B is configured to receive the cabinet control instruction that is transmitted by the interface unit A, modulate the cabinet control instruction onto a power cable, and transmit the cabinet control instruction to the direct current power distributor 33 by using the second power input unit D.

The direct current power distributor 33 is configured to transmit the cabinet control instruction to the target cabinet by using a power cable.

The target cabinet is configured to demodulate the cabinet control instruction from the power cable, and after determining that an address of the target cabinet is the same as the address of the target cabinet included in the cabinet control instruction, perform a corresponding control operation in response to the cabinet control instruction.

For example, the interface unit A may receive the cabinet control instruction that is transmitted by the BBU 34 and includes an address of the cabinet 1 (that is, the address of the cabinet 1 is the address of the target cabinet), and transmit the cabinet control instruction to the second power cable communications unit B; the second power cable communications unit B receives the cabinet control instruction that is transmitted by the interface unit A, modulates the cabinet control instruction onto the power cable, and transmits the cabinet control instruction to the direct current power distributor 33 by using the second power input unit D; the direct current power distributor 33 transmits the cabinet control instruction to the cabinet 1 to the cabinet n by using power cables; and the cabinet 1 demodulates the cabinet control instruction from the power cable and after determining that an address of the cabinet 1 is the same as the address of the cabinet 1 included in the cabinet control instruction, performs a corresponding control operation in response to the cabinet control instruction. However, the cabinet 2 to the cabinet n demodulate the cabinet control instruction from the power cables, and after determining that addresses of the cabinet 2 to the cabinet n are not the same as the address of the cabinet 1 included in the cabinet control instruction, may ignore the cabinet control instruction.

Figure 9:
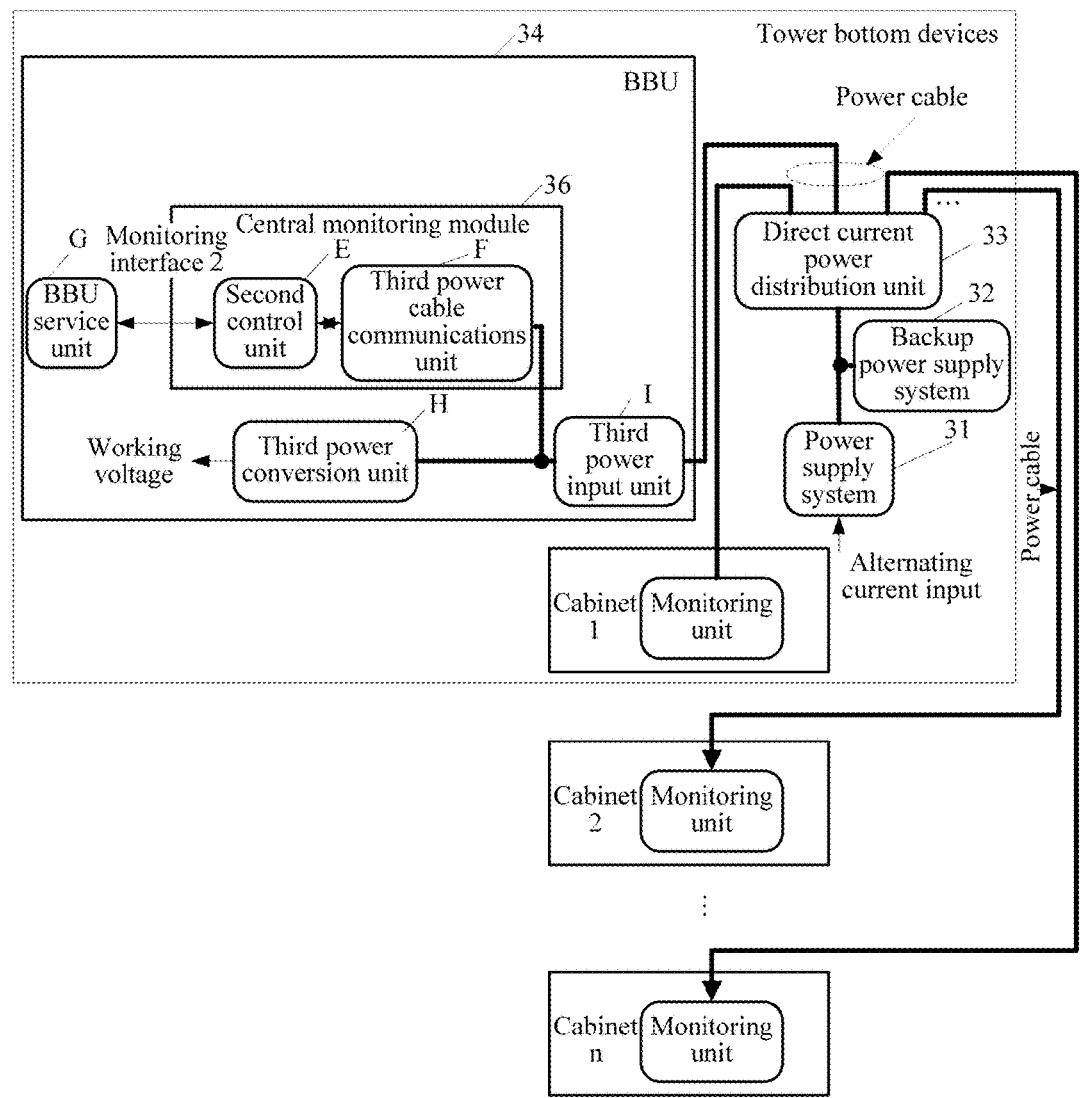
FIG. 9 is a schematic structural diagram of another system for controlling a radio base station according to an embodiment of the present disclosure.

FIG. 9 is a schematic structural diagram of another system for controlling a radio base station according to an embodiment of the present disclosure. The system for controlling a radio base station shown in FIG. 9 includes a power supply system 31, a backup power supply system 32, a direct current power distributor 33, a BBU 34, and at least one cabinet. An input port of the direct current power distributor 33 is connected to direct current ports of the power supply system 31 and the backup power supply system 32; the BBU 34 and the cabinet are respectively connected to direct current power supply ports of the direct current power distributor 33 by using power cables; in actual deployment, some cabinets (such as a cabinet 1) may be deployed as tower bottom devices together with the BBU 34, the power supply system 31, the backup power supply system 32, the direct current power distributor 33, and the like, but some cabinets (such as a cabinet 2 to a cabinet n) may be deployed in an equipment room far away from an RRU 35.

The system for controlling a radio base station shown in FIG. 9 further includes a central monitoring module 36. The central monitoring module 36 is deployed independently of the BBU 34. In this case, the central monitoring module 36 may include a second control unit E and a third power cable communications unit F. The second control unit E is configured to receive a cabinet control instruction that is transmitted by a BBU service unit G and includes an address of a target cabinet, and transmit the cabinet control instruction to the third power cable communications unit F. The third power cable communications unit F is configured to modulate the cabinet control instruction onto a power cable, and transmit the cabinet control instruction to the direct current power distributor 33 by using a third power input unit.

The direct current power distributor 33 is configured to transmit the cabinet control instruction to the target cabinet by using a power cable.

The target cabinet is configured to demodulate the cabinet control instruction from the power cable, and after determining that an address of the target cabinet is the same as the address of the target cabinet included in the cabinet control instruction, perform a corresponding control operation in response to the cabinet control instruction.

For example, the second control unit E may receive the cabinet control instruction that is transmitted by the BBU service unit G and includes an address of the cabinet 1 (that is, the address of the cabinet 1 is the address of the target cabinet), and transmit the cabinet control instruction to the third power cable communications unit F; the third power cable communications unit F receives the cabinet control instruction that is transmitted by the second control unit E, modulates the cabinet control instruction onto the power cable, and transmits the cabinet control instruction to the direct current power distributor 33 by using the third power input unit I; the direct current power distributor 33 transmits the cabinet control instruction to the cabinet 1 to the cabinet n by using power cables; and the cabinet 1 demodulates the cabinet control instruction from the power cable and after determining that an address of the cabinet 1 is the same as the address of the cabinet 1 included in the cabinet control instruction, performs a corresponding control operation in response to the cabinet control instruction. However, the cabinet 2 to the cabinet n demodulate the cabinet control instruction from the power cables, and after determining that addresses of the cabinet 2 to the cabinet n are not the same as the address of the cabinet 1 included in the cabinet control instruction, may ignore the cabinet control instruction.

In the systems for controlling a radio base station shown in FIG. 8 and FIG. 9, out-of-band emergency channels based on power cables can also be established between cabinets and multiple RRUs. In this way, if the BBU does not need to be connected to monitoring units in the cabinet 1 to the cabinet n by using monitoring cables, the BBU can control the cabinets by using corresponding power cables. Therefore, monitoring cables between the BBU and the cabinets are saved, and project installation costs and difficulty of a radio base station can be reduced.

In the embodiments of the present disclosure, for better understanding the embodiments of the present disclosure, the following further describes a structure and functions of a direct current power distributor 33 involved in an embodiment of the present disclosure.

Figure 10:
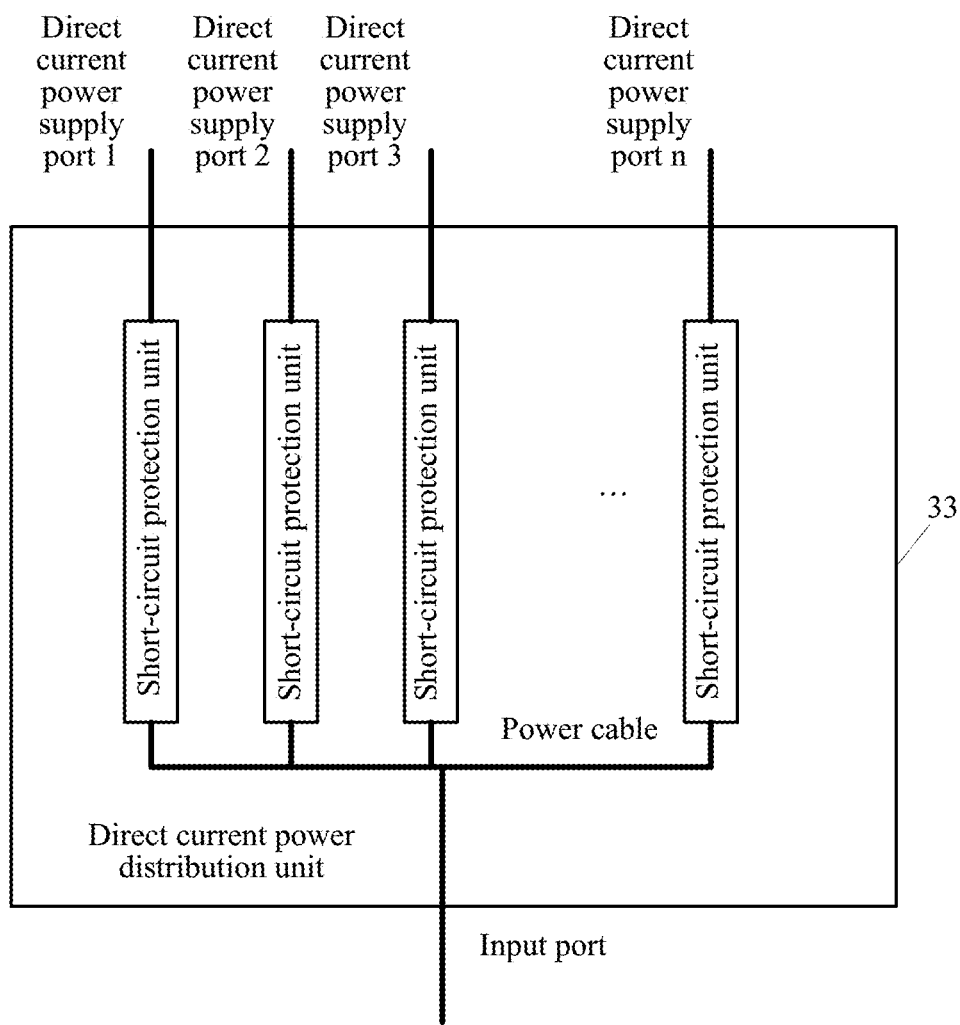
FIG. 10 is a schematic structural diagram of a direct current power distributor according to an embodiment of the present disclosure.

FIG. 10 is a schematic structural diagram of a direct current power distributor 33 according to an embodiment of the present disclosure. As shown in FIG. 10, an input port of the direct current power distributor 33 is connected to each direct current power supply port (namely, a direct current power supply port 1 to a direct current power supply port n) of the direct current power distributor 33 by using an internal short-circuit protection unit 331, so as to implement a power cable connection between the input port of the direct current power distributor 33 and any direct current power supply port. That is, a power cable connection may be implemented between any two direct current power supply ports of the direct current power distributor 33. In the direct current power distributor 33 shown in FIG. 10, the input port of the direct current power distributor 33 may be connected to direct current ports of a power supply system 31 and a backup power supply system 32, and is configured to divide a direct current (such as −48 V) input by the power supply system, into multiple direct currents and distribute the multiple direct currents to different base station devices, such as a BBU, an RRU, a central monitoring module, and a cabinet. In addition, the direct current power distributor 33 may further provide functions such as overcurrent protection for each of the distributed direct currents by using the internal short-circuit protection unit 331. In an actual application, the short-circuit protection unit 331 may be implemented by using a breaker or a fuse.

In the direct current power distributor 33 shown in FIG. 10, information received by any direct current power supply port of the direct current power distributor 33 may be output from other direct current power supply ports. For example, in the system for controlling a radio base station shown in FIG. 7, when the direct current power supply port 1 of the direct current power distributor 33 receives the RRU control information that is transmitted by the BBU 34 and includes the address of the RRU 35 and the control instruction, the RRU control information may be output from the direct current power supply ports 2 to n by using each short-circuit protection unit 331. Correspondingly, all base station devices (such as the RRU 35 and the cabinet) connected to the direct current power supply ports 2 to n by using power cables can receive the RRU control information. However, because the RRU control information includes the address of the RRU 35, the RRU 35 can obtain, by using the first power cable communications unit d, the RRU control information through parsing, and perform a corresponding control operation. Before parsing the RRU control information, other RRUs and cabinets may first identify that addresses of the other RRUs and cabinets do not match the address of the RRU 35 included in the RRU control information, or after obtaining the RRU control information through parsing, identify that addresses of the other RRUs and cabinets do not match the address of the RRU 35 included in the RRU control information, and ignore the RRU control information.

Figure 11:
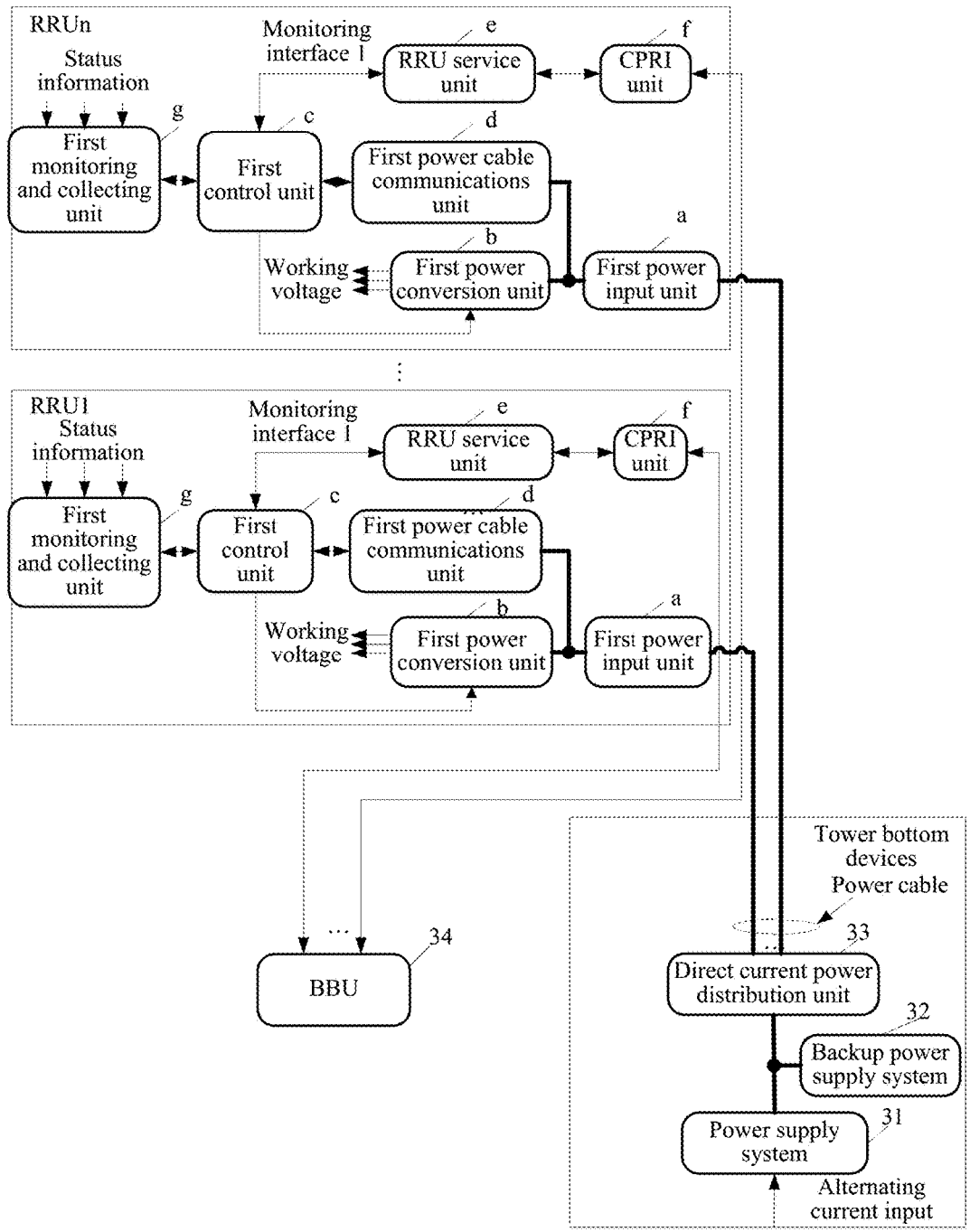
FIG. 11 is a schematic structural diagram of another system for controlling a radio base station according to an embodiment of the present disclosure.

FIG. 11 is a schematic structural diagram of another system for controlling a radio base station according to an embodiment of the present disclosure. The system for controlling a radio base station shown in FIG. 11 may include a power supply system 31, a backup power supply system 32, a direct current power distributor 33, a BBU 34, and at least two RRUs (namely, an RRU 1 to an RRU n). The power supply system 31, the backup power supply system 32, and the direct current power distributor 33 may be installed at the tower bottom as tower bottom devices for ease of manual maintenance; and the at least two RRUs (namely, the RRU 1 to the RRU n) may be installed at the tower top close to an antenna to reduce a feeder loss. The BBU 34 is installed in an equipment room far away from the RRUs (namely, the RRU 1 to the RRU n). An input port of the direct current power distributor 33 is connected to direct current ports of the power supply system 31 and the backup power supply system 32, and the BBU 34 is communicatively connected to the at least two RRUs (namely, the RRU 1 to the RRU n) by using CPRIs, where the at least two RRUs (namely, the RRU 1 to the RRU n) include a first RRU and a target RRU.

The BBU 34 is configured to transmit RRU control information to the first RRU by using the CPRI, where the RRU control information includes an address of the target RRU and a control instruction.

The first RRU is configured to modulate the RRU control information onto a power cable, and transmit the RRU control information to the direct current power distributor 33.

The direct current power distributor 33 is configured to transmit the RRU control information to the target RRU by using a power cable.

The target RRU is configured to demodulate, from the power cable, the RRU control information transmitted by the direct current power distributor 33, and after determining that an address of the target RRU is the same as the address of the target RRU included in the RRU control information, perform a corresponding control operation in response to the control instruction included in the RRU control information.

In the system for controlling a radio base station shown in FIG. 11, each RRU may include a first power input unit a, a first power conversion unit b, a first control unit c, a first power cable communications unit d, an RRU service unit e, and a CPRI unit f, where the first power conversion unit b and the first power cable communications unit d respectively establish a power cable connection to a direct current power supply port of the direct current power distributor 33 by using the first power input unit a. That is, by using the first power input unit a, not only a power cable connection may be implemented between the first power conversion unit b and the direct current power supply port of the direct current power distributor 33, but also a power cable connection may be implemented between the first power cable communications unit d and the direct current power supply port of the direct current power distributor 33. In an embodiment, the first power input unit a not only has a function of implementing a power cable connection between the first power conversion unit b and the direct current power supply port of the direct current power distributor 33 and a power cable connection between the first power cable communications unit d and the direct current power supply port of the direct current power distributor 33 respectively, but also has functions such as lightning protection and overvoltage protection.

The first control unit c is communicatively connected to the first power cable communications unit d and the RRU service unit e; the RRU service unit e is communicatively connected to the CPRI unit f, and the CPRI unit f is configured to communicatively connect to the BBU 34, that is, the RRU service unit e is communicatively connected to the BBU 34 by using the CPRI unit f.

The BBU 34 may transmit the RRU control information that includes the address of the target RRU and the control instruction to the RRU service unit e of the RRU 1 by using the CPRI unit f of the RRU 1; the RRU service unit e of the RRU 1 may transmit the RRU control information to the first control unit c of the RRU 1; the first control unit c of the RRU 1 may transmit the RRU control information to the first power cable communications unit d of the RRU 1; the first power cable communications unit d of the RRU 1 may modulate the RRU control information onto the power cable, and transmit the RRU control information to the direct current power distributor 33 by using the first power input unit a of the RRU 1; and correspondingly, the direct current power distributor 33 is configured to transmit the RRU control information to the target RRU by using the power cable; the first power cable communications unit d of the target RRU is configured to demodulate, from the power cable, the RRU control information that is transmitted by the direct current power distributor 33 by using the first power input unit a of the target RRU, and after determining that an address of the target RRU is the same as the address of the target RRU included in the RRU control information, transmit the demodulated RRU control information to the first control unit c of the target RRU; the first control unit c of the target RRU is configured to identify a to-be-performed operation type according to the control instruction included in the RRU control information; and when the operation type is an operation type performed by an RRU service unit, the first control unit c of the target RRU transmits the control instruction to the RRU service unit e of the target RRU, so as to trigger the RRU service unit e of the target RRU to perform a corresponding control operation in response to the control instruction.

Example 1

The BBU 34 may transmit RRU control information that includes an address of the RRU n and a control instruction to the RRU service unit e of the RRU 1 by using the CPRI unit f of the RRU 1; the RRU service unit e of the RRU 1 transmits the RRU control information to the first control unit c of the RRU 1; the first control unit c of the RRU 1 transmits the RRU control information to the first power cable communications unit d of the RRU 1; the first power cable communications unit d of the RRU 1 modulates the RRU control information onto the power cable, and transmits the RRU control information to the direct current power distributor 33 by using the first power input unit a of the RRU 1; and correspondingly, the direct current power distributor 33 transmits the RRU control information to the RRU n by using a power cable; the first power cable communications unit d of the RRU n demodulates, from the power cable, the RRU control information that is transmitted by the direct current power distributor 33 by using the first power input unit a of the RRU n, and after determining that an address of the RRU n is the same as the address of the RRU n included in the RRU control information, transmits the demodulated RRU control information to the first control unit c of the RRU n; the first control unit c of the RRU n identifies a to-be-performed operation type according to the control instruction included in the RRU control information; and when the operation type is an operation type performed by an RRU service unit, the first control unit c of the RRU n transmits the control instruction to the RRU service unit e of the RRU n, so as to trigger the RRU service unit e of the RRU n to perform a corresponding control operation in response to the control instruction.

It can be seen that, in the system for controlling a radio base station shown in FIG. 11, out-of-band emergency channels based on power cables can be established among multiple RRUs, so that even if a unique communications interface CPRI between a BBU and a certain target RRU is abnormal, the BBU can still effectively control the target RRU by using an out-of-band emergency channel between any RRU (a unique communications interface CPRI of the RRU is normal) and the target RRU. Dispatching a person to a site for maintenance can be avoided, maintenance costs can be reduced, and a service interruption time of an RRU can also be shortened greatly.

In an optional implementation manner, in the system for controlling a radio base station shown in FIG. 11, the first power conversion unit b of each RRU is communicatively connected to the first control unit c of the RRU, and correspondingly, the first control unit c is further configured to transmit the control instruction to the first power conversion unit b of the RRU when identifying, according to the control instruction, that the to-be-performed operation type is a power operation type, so as to trigger the first power conversion unit b of the RRU to perform a corresponding power control operation in response to the control instruction, where the power control operation includes a power-on or power-off control operation. In this optional implementation manner, the BBU 34 may also implement flexible power control on the RRU without using the CPRI unit f of the RRU, so that incapability of implementing complete power-off on the RRU by the BBU 34 by using the CPRI unit f can be overcome effectively. This is because the CPRI unit f cannot communicate normally when the BBU 34 implements complete power-off on the RRU by using the CPRI unit f, and in this case, the BBU 34 cannot control the RRU to power on again.

In an optional implementation manner, in the system for controlling a radio base station shown in FIG. 11, each RRU further includes a first monitoring and collecting unit g, where the first monitoring and collecting unit g is communicatively connected to the first control unit c. The first monitoring and collecting unit g is configured to collect status information of the RRU and transmit the status information to the first control unit c of the RRU, where the status information of the RRU includes status information of the RRU service unit e of the RRU, such as voltage status information, temperature status information, and output power status information of the RRU service unit e.

In an optional implementation manner, in the system for controlling a radio base station shown in FIG. 11, the first control unit c of the target RRU is further configured to transmit the control instruction to the first monitoring and collecting unit g of the target RRU when identifying, according to the control instruction, that the to-be-performed operation type is a status information collection operation type, so as to trigger the first monitoring and collecting unit g to collect status information of the target RRU and transmit the status information to the first control unit c of the target RRU.

In an optional implementation manner, in the system for controlling a radio base station shown in FIG. 11, when the operation type is the operation type performed by the RRU service unit, the first control unit c of the target RRU is further configured to receive an RRU service unit control result transmitted by the RRU service unit e of the target RRU, add the RRU service unit control result and an address of the BBU to response information, and transmit the response information to the first power cable communications unit d of the target RRU; or when the operation type is the power operation type, the first control unit c of the target RRU is further configured to receive a target RRU power control result transmitted by the first power conversion unit b of the target RRU, add the target RRU power control result and an address of the BBU to response information, and transmit the response information to the first power cable communications unit d of the target RRU; and the first power cable communications unit d of the target RRU is further configured to modulate the response information onto the power cable, and transmit the response information to the direct current power distributor 33 by using the first power input unit a of the target RRU; the direct current power distributor 33 is further configured to transmit the response information to the first power cable communications unit d of the first RRU by using the first power input unit a of the first RRU; the first power cable communications unit d of the first RRU is further configured to transmit the response information to the RRU service unit e of the first RRU by using the first control unit c of the first RRU; and the RRU service unit e of the first RRU is further configured to transmit the response information to the BBU 34 by using the CPRI unit f of the first RRU.

In an optional implementation manner, in the system for controlling a radio base station shown in FIG. 11, when the operation type is the status information collection operation type, the first control unit c of the target RRU is further configured to add the status information of the target RRU and an address of the BBU to status feedback information, and transmit the status feedback information to the first power cable communications unit d of the target RRU; and the first power cable communications unit d of the target RRU is further configured to modulate the status feedback information onto the power cable, and transmit the status feedback information to the direct current power distributor 33 by using the first power input unit a of the target RRU; the direct current power distributor 33 is further configured to transmit the status feedback information to the first power cable communications unit d of the first RRU by using the first power input unit a of the first RRU; the first power cable communications unit d of the first RRU is further configured to transmit the status feedback information to the RRU service unit e of the first RRU by using the first control unit c of the first RRU; and the RRU service unit e of the first RRU is further configured to transmit the status feedback information to the BBU 34 by using the CPRI unit f of the first RRU.

With reference to the foregoing Example 1, an example is further provided. Assuming that the target RRU is the RRU n, if the operation type is the operation type performed by the RRU service unit, the first control unit c of the RRU n may further receive an RRU service unit control result transmitted by the RRU service unit e of the RRU n, add the RRU service unit control result and the address of the BBU 34 to response information, and transmit the response information to the first power cable communications unit d of the RRU n; or when the operation type is the power operation type, the first control unit c of the RRU n may further receive an RRU n power control result transmitted by the first power conversion unit b of the RRU n, add the RRU n power control result and the address of the BBU 34 to response information, and transmit the response information to the first power cable communications unit d of the RRU n; and the first power cable communications unit d of the RRU n further modulates the response information onto the power cable, and transmits the response information to the direct current power distributor 33 by using the first power input unit a of the RRU n; the direct current power distributor 33 is further configured to transmit the response information to the first power cable communications unit d of the RRU 1 by using the first power input unit a of the RRU 1; the first power cable communications unit d of the RRU 1 further transmits the response information to the RRU service unit e of the RRU 1 by using the first control unit c of the RRU 1; and the RRU service unit e of the RRU 1 further transmits the response information to the BBU 34 by using the CPRI unit f of the RRU 1.

Figure 12:
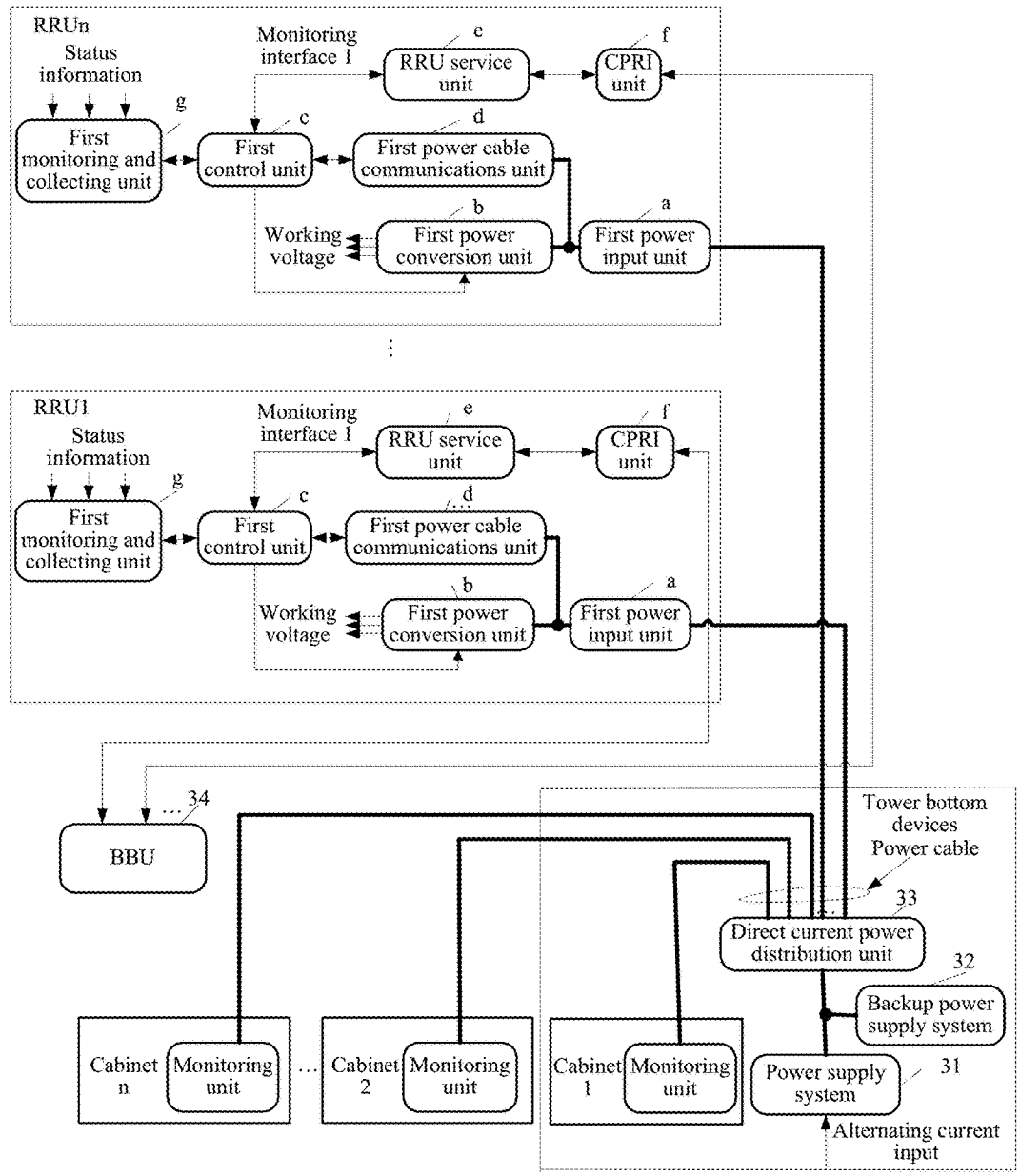
FIG. 12 is a schematic structural diagram of another system for controlling a radio base station according to an embodiment of the present disclosure.

FIG. 12 is a schematic structural diagram of another system for controlling a radio base station that is obtained by optimizing the system for controlling a radio base station shown in FIG. 11 according to an embodiment of the present disclosure. Compared with the system for controlling a radio base station shown in FIG. 11, the system for controlling a radio base station shown in FIG. 12 may further include at least one cabinet, where each cabinet (mainly including a monitoring unit) is connected to a direct current power supply port of a direct current power distributor 33 by using a power cable; in actual deployment, some cabinets (such as a cabinet 1) may be deployed as tower bottom devices together with a BBU 34, a power supply system 31, a backup power supply system 32, the direct current power distributor 33, and the like, but some cabinets (such as a cabinet 2 to a cabinet n) may be deployed in an equipment room far away from RRUs (namely, an RRU 1 to an RRU n).

The BBU 34 is further configured to transmit a cabinet control instruction including an address of a target cabinet to an RRU service unit e of a first RRU by using a CPRI unit f of the first RRU; the RRU service unit e of the first RRU is configured to transmit the target cabinet control instruction to a first control unit c of the first RRU; the first control unit c of the first RRU is configured to transmit the target cabinet control instruction to a first power cable communications unit d of the first RRU; the first power cable communications unit d of the first RRU is configured to modulate the target cabinet control instruction onto a power cable, and transmit the target cabinet control instruction to the direct current power distributor 33 by using a first power input unit a of the first RRU; and correspondingly, the direct current power distributor 33 is configured to transmit the target cabinet control instruction to the target cabinet by using a power cable; the target cabinet is configured to demodulate the cabinet control instruction from the power cable, and after determining that an address of the target cabinet is the same as the address of the target cabinet included in the cabinet control instruction, perform a corresponding control operation in response to the cabinet control instruction.

For example, the BBU 34 may transmit, by using a CPRI unit f of the RRU 1, a cabinet control instruction that includes an address of the cabinet 2 to an RRU service unit e of the RRU 1; the RRU service unit e of the RRU 1 transmits the target cabinet control instruction to a first control unit c of the RRU 1; the first control unit c of the RRU 1 transmits the target cabinet control instruction to a first power cable communications unit d of the RRU 1; the first power cable communications unit d of the RRU 1 modulates the target cabinet control instruction onto the power cable, and transmits the target cabinet control instruction to the direct current power distributor 33 by using a first power input unit a of the RRU 1; and correspondingly, the direct current power distributor 33 transmits the cabinet control instruction to the cabinet 2 by using a power cable, so as to trigger the cabinet 2 to perform a corresponding control operation in response to the cabinet control instruction.

In the system for controlling a radio base station shown in FIG. 12, a structure and functions of the direct current power distributor 33 are already described in the foregoing embodiment, and details are not described herein again.

In the system for controlling a radio base station shown in FIG. 12, out-of-band emergency channels based on power cables can also be established between cabinets and multiple RRUs. In this way, if the BBU does not need to be connected to monitoring units in the cabinet 1 to the cabinet n by using monitoring cables, the BBU can control the cabinets by using corresponding power cables. Therefore, monitoring cables between the BBU and the cabinets are saved, and project installation costs and difficulty of a radio base station can be reduced.

Figure 13:
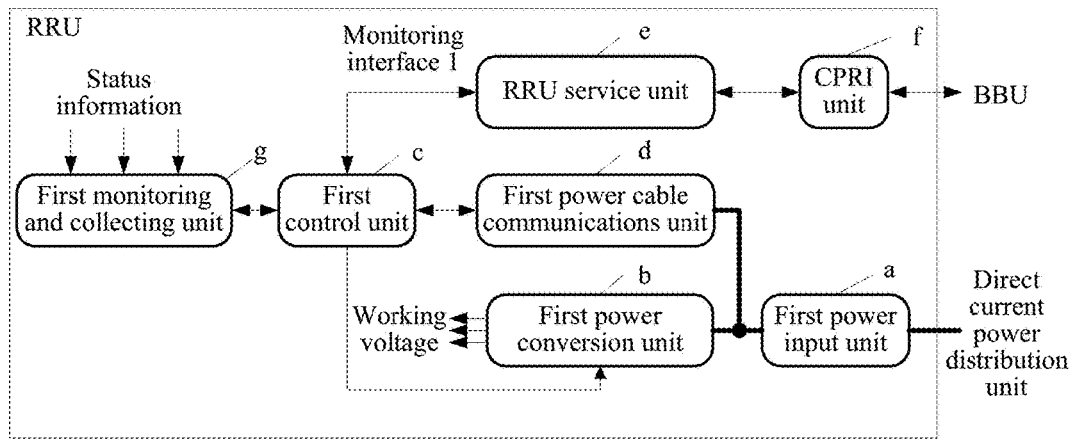
FIG. 13 is a schematic structural diagram of an RRU according to an embodiment of the present disclosure.

FIG. 13 is a schematic structural diagram of an RRU according to an embodiment of the present disclosure. A structure and functions of the RRU shown in FIG. 13 are the same as the structure and functions of the RRU 35 described in the foregoing embodiment, and details are not described in this embodiment of the present disclosure again. An out-of-band emergency channel based on a power cable can be established between the RRU described in FIG. 13 and a BBU, so that even if a unique communications interface CPRI between the BBU and the RRU is abnormal, the BBU can still effectively control the RRU by using the out-of-band emergency channel. In addition, out-of-band emergency channels based on power cables can also be established between the RRU described in FIG. 13 and other RRUs and cabinets, so that even if a unique communications interface CPRI between the BBU and a certain target RRU is abnormal, the BBU can still effectively control the target RRU by using an out-of-band emergency channel between the RRU described in FIG. 13 (a unique communications interface CPRI of the RRU is normal) and the target RRU. Alternatively, the BBU can further effectively control a target cabinet by using an out-of-band emergency channel between the RRU described in FIG. 13 (a unique communications interface CPRI of the RRU is normal) and the target cabinet.

Figure 14:
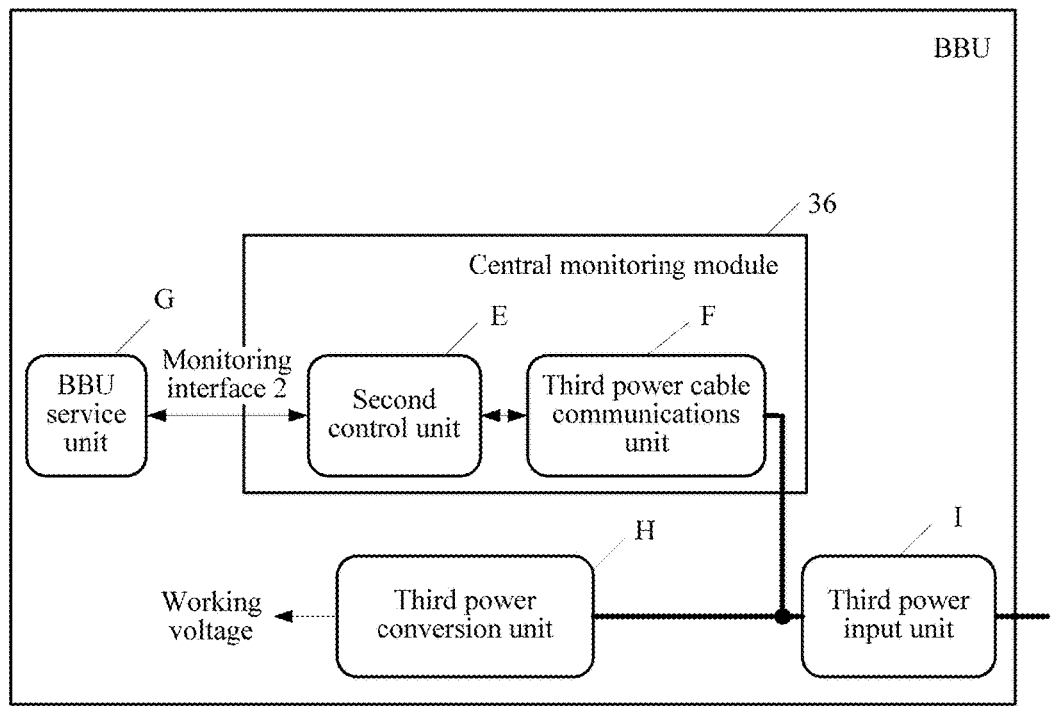
FIG. 14 is a schematic structural diagram of a BBU according to an embodiment of the present disclosure.

FIG. 14 is a schematic structural diagram of a BBU according to an embodiment of the present disclosure. A structure and functions of the BBU shown in FIG. 14 are the same as the structure and functions of the BBU 34 described in the foregoing embodiment, and details are not described in this embodiment of the present disclosure again. An out-of-band emergency channel based on a power cable can be established between the BBU described in FIG. 14 and an RRU, so that even if a unique communications interface CPRI between the BBU and the RRU is abnormal, the BBU can still effectively control the RRU by using the out-of-band emergency channel. In addition, out-of-band emergency channels based on power cables can also be established between the BBU described in FIG. 14 and cabinets. In this way, if the BBU does not need to be connected to monitoring units in the cabinets by using monitoring cables, the BBU can control the cabinets by using corresponding power cables. Therefore, monitoring cables between the BBU and the cabinets are saved, and project installation costs and difficulty of a radio base station can be reduced.

Figure 15:
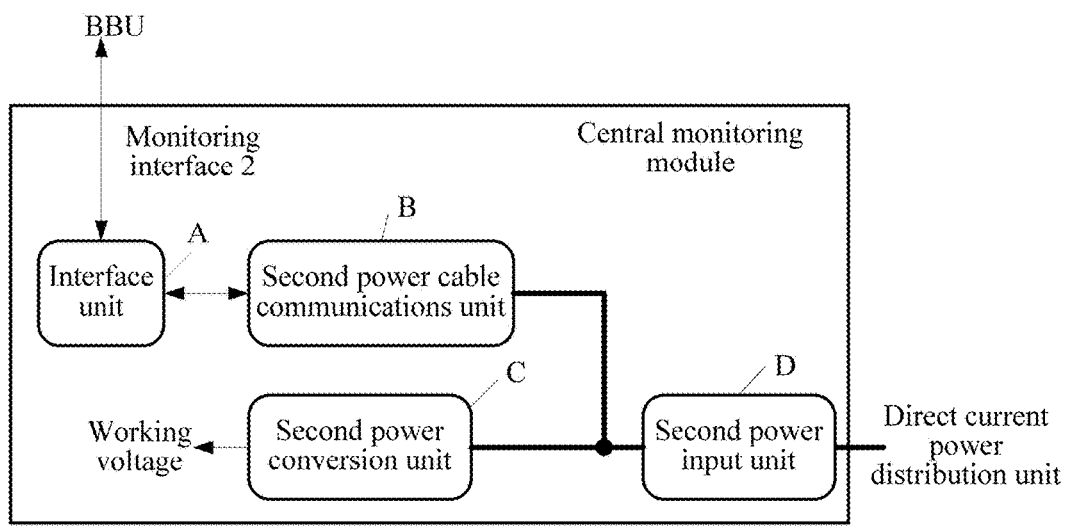
FIG. 15 is a schematic structural diagram of a central monitoring module according to an embodiment of the present disclosure.

FIG. 15 is a schematic structural diagram of a central monitoring module according to an embodiment of the present disclosure. A structure and functions of the central monitoring module shown in FIG. 15 are the same as the structure and functions of the central monitoring module 36 described in the foregoing embodiment, and details are not described in this embodiment of the present disclosure again. An out-of-band emergency channel based on a power cable can be established between a BBU and an RRU by using the central monitoring module shown in FIG. 15, so that even if a unique communications interface CPRI between the BBU and the RRU is abnormal, the BBU can still effectively control the RRU by using the out-of-band emergency channel. In addition, out-of-band emergency channels based on power cables can also be established between the BBU and cabinets by using the central monitoring module shown in FIG. 15. In this way, if the BBU does not need to be connected to monitoring units in the cabinets by using monitoring cables, the BBU can control the cabinets by using corresponding power cables. Therefore, monitoring cables between the BBU and the cabinets are saved, and project installation costs and difficulty of a radio base station can be reduced.

Figure 16:
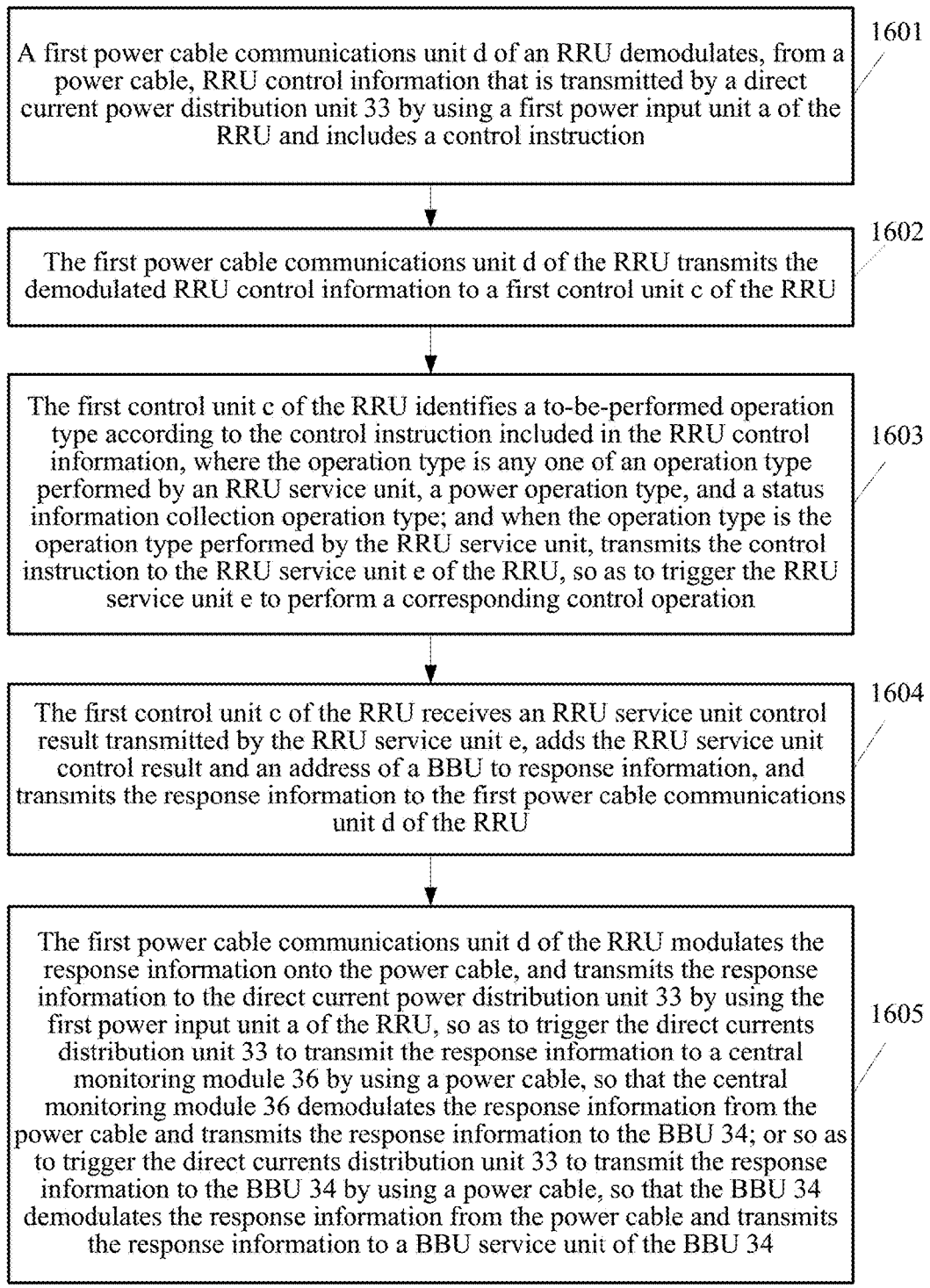
FIG. 16 is a schematic flowchart of a method for controlling a radio base station according to an embodiment of the present disclosure.

FIG. 16 is a schematic flowchart of a method for controlling a radio base station according to an embodiment of the present disclosure. The method for controlling a radio base station is described from a perspective of an RRU. As shown in FIG. 16, the method for controlling a radio base station may include the following steps.

1601. A first power cable communications unit d of an RRU demodulates, from a power cable, RRU control information that is transmitted by a direct current power distributor 33 by using a first power input unit a of the RRU and includes a control instruction.

1602. The first power cable communications unit d of the RRU transmits the demodulated RRU control information to a first control unit c of the RRU.

1603. The first control unit c of the RRU identifies a to-be-performed operation type according to the control instruction included in the RRU control information, where the operation type is any one of an operation type performed by an RRU service unit e, a power operation type, and a status information collection operation type; and when the operation type is the operation type performed by the RRU service unit e, transmits the control instruction to the RRU service unit e of the RRU, so as to trigger the RRU service unit e to perform a corresponding control operation.

1604. The first control unit c of the RRU receives an RRU service unit control result transmitted by the RRU service unit e, adds the RRU service unit control result and an address of a BBU 34 to response information, and transmits the response information to the first power cable communications unit d of the RRU.

1605. The first power cable communications unit d of the RRU modulates the response information onto the power cable, and transmits the response information to the direct current power distributor 33 by using the first power input unit a of the RRU, so as to trigger the direct current power distributor 33 to transmit the response information to a central monitoring module 36 by using a power cable, so that the central monitoring module 36 demodulates the response information from the power cable and transmits the response information to the BBU 34; or so as to trigger the direct current power distributor 33 to transmit the response information to the BBU 34 by using a power cable, so that the BBU 34 demodulates the response information from the power cable and transmits the response information to a BBU service unit of the BBU 34.

In an embodiment, the RRU control information further includes an RRU address, where the RRU address included in the RRU control information is the same as an address of the RRU to which the first power cable communications unit d belongs.

In an optional implementation manner, in the method described in FIG. 16, when the first control unit c of the RRU identifies, according to the control instruction included in the RRU control information, that the to-be-performed operation type is the power operation type, the first control unit c of the RRU may also transmit the control instruction to a first power conversion unit b of the RRU, so as to trigger the first power conversion unit b of the RRU to perform a corresponding power control operation in response to the control instruction, where the power control operation includes a power-on or power-off control operation.

Correspondingly, the first control unit c of the RRU may further receive an RRU power control result transmitted by the first power conversion unit b, add the RRU power control result and the address of the BBU to response information, and transmit the response information to the first power cable communications unit d of the RRU.

Correspondingly, the first power cable communications unit d of the RRU may further modulate the response information onto the power cable, and transmit the response information to the direct current power distributor 33 by using the first power input unit a of the RRU, so as to trigger the direct current power distributor 33 to transmit the response information to the central monitoring module 36 by using the power cable, so that the central monitoring module 36 demodulates the response information from the power cable and transmits the response information to the BBU 34; or so as to trigger the direct current power distributor 33 to transmit the response information to the BBU 34 by using the power cable, so that the BBU 34 demodulates the response information from the power cable and transmits the response information to the BBU service unit of the BBU 34.

In an optional implementation manner, the method described in FIG. 16 may further include the following step:

A first monitoring and collecting unit g of the RRU collects status information of the RRU, and transmits the status information to the first control unit c of the RRU, where the status information of the RRU includes status information of the RRU service unit e.

Optionally, when the first control unit c of the RRU may identify, according to the control instruction included in the RRU control information, that the to-be-performed operation type is the status information collection operation type, the first control unit c of the RRU transmits the control instruction to the first monitoring and collecting unit g of the RRU, so as to trigger the first monitoring and collecting unit g of the RRU to collect the status information of the RRU and transmit the status information to the first control unit c of the RRU.

Correspondingly, the first control unit c of the RRU may further add the status information of the RRU and the address of the BBU to status feedback information, and transmit the status feedback information to the first power cable communications unit d of the RRU.

Correspondingly, the first power cable communications unit d of the RRU modulates the status feedback information onto the power cable, and transmits the status feedback information to the direct current power distributor 33 by using the first power input unit a of the RRU, so as to trigger the direct current power distributor 33 to transmit the status feedback information to the central monitoring module 36 by using the power cable, so that the central monitoring module 36 demodulates the status feedback information from the power cable and transmits the status feedback information to the BBU 34; or so as to trigger the direct current power distributor 33 to transmit the status feedback information to the BBU 34 by using the power cable, so that the BBU 34 demodulates the status feedback information from the power cable and transmits the status feedback information to the BBU service unit of the BBU 34.

In an optional implementation manner, the method described in FIG. 16 may further include the following steps.

11. The RRU service unit e of the RRU receives, by using a CPRI unit f of the RRU, RRU control information that is transmitted by the BBU 34 and includes an address of a target RRU and a control instruction, and transmits the RRU control information to the first control unit c of the RRU.

12. The first control unit c of the RRU transmits the RRU control information to the first power cable communications unit d of the RRU.

13. The first power cable communications unit d of the RRU modulates the RRU control information onto the power cable, and transmits the RRU control information to the direct current power distributor 33 by using the first power input unit a of the RRU, so as to trigger the direct current power distributor 33 to transmit the RRU control information that includes the address of the target RRU and the control instruction to the target RRU by using a power cable, to perform a corresponding control operation.

In an optional implementation manner, the method described in FIG. 16 may further include the following steps.

21. The RRU service unit e of the RRU receives, by using a CPRI unit f, a cabinet control instruction that is transmitted by the BBU 34 and includes an address of a target cabinet, and transmits the cabinet control instruction to the first control unit c of the RRU.

22. The first control unit c of the RRU transmits the cabinet control instruction to the first power cable communications unit d of the RRU.

23. The first power cable communications unit d of the RRU modulates the cabinet control instruction onto the power cable, and transmits the cabinet control instruction to the direct current power distributor 33 by using the first power input unit a of the RRU, so as to trigger the direct current power distributor 33 to transmit the cabinet control instruction to the target cabinet by using a power cable, so as to trigger the target cabinet to perform a corresponding control operation in response to the cabinet control instruction.

In the method for controlling a radio base station described in FIG. 16, an out-of-band emergency channel based on a power cable can be established between an RRU and a BBU, so that even if a unique communications interface CPRI between the RRU and the BBU is abnormal, the RRU can still be effectively controlled by the BBU by using the out-of-band emergency channel. In addition, in the method for controlling a radio base station described in FIG. 16, out-of-band emergency channels based on power cables can also be established between an RRU and other RRUs and cabinets, so that even if a unique communications interface CPRI between a BBU and a certain target RRU is abnormal, the BBU can still effectively control the target RRU by using an out-of-band emergency channel between the RRU (a unique communications interface CPRI of the RRU is normal) and the target RRU. Alternatively, the BBU can further effectively control a target cabinet by using an out-of-band emergency channel between the RRU (a unique communications interface CPRI of the RRU is normal) and the target cabinet.

Figure 17:
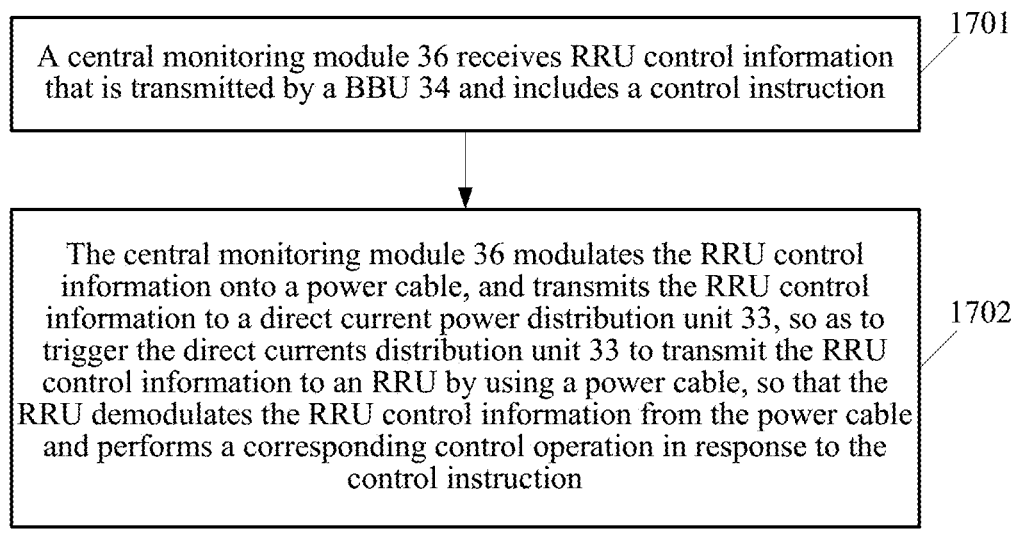
FIG. 17 is a schematic flowchart of another method for controlling a radio base station according to an embodiment of the present disclosure.

FIG. 17 is a schematic flowchart of another method for controlling a radio base station according to an embodiment of the present disclosure. The method for controlling a radio base station is described from a perspective of a central monitoring module. As shown in FIG. 17, the method for controlling a radio base station may include the following steps.

1701. A central monitoring module 36 receives RRU control information that is transmitted by a BBU 34 and includes a control instruction.

1702. The central monitoring module 36 modulates the RRU control information onto a power cable, and transmits the RRU control information to a direct current power distributor 33, so as to trigger the direct current power distributor 33 to transmit the RRU control information to an RRU by using a power cable, so that the RRU demodulates the RRU control information from the power cable and performs a corresponding control operation in response to the control instruction.

In an embodiment, the RRU control information further includes an RRU address, where an address of the RRU that demodulates the RRU control information from the power cable is the same as the RRU address included in the RRU control information.

In an optional implementation manner, the method described in FIG. 17 may further include the following step:

When the RRU identifies, according to the control instruction included in the RRU control information, that a to-be-performed operation type is an operation type performed by an RRU service unit, the central monitoring module 36 demodulates, from the power cable, response information that is transmitted by the direct current power distributor 33 and includes an RRU service unit control result and an address of the BBU, and transmits the response information to the BBU; or when the RRU identifies, according to the control instruction included in the RRU control information, that a to-be-performed operation type is a power operation type, the central monitoring module 36 demodulates, from the power cable, response information that is transmitted by the direct current power distributor 33 and includes an RRU power control result and an address of the BBU, and transmits the response information to the BBU.

In an optional implementation manner, the method described in FIG. 17 may further include the following step:

When the RRU identifies, according to the control instruction included in the RRU control information, that a to-be-performed operation type is a status information collection operation type, the central monitoring module 36 demodulates, from the power cable, status feedback information that is transmitted by the direct current power distributor 33 and includes status information of the RRU and an address of the BBU, and transmits the status feedback information to the BBU.

In an optional implementation manner, the method described in FIG. 17 may further include the following step:

The central monitoring module 36 receives a cabinet control instruction that is transmitted by the BBU and includes an address of a target cabinet, modulates the cabinet control instruction onto the power cable, and transmits the cabinet control instruction to the direct current power distributor 33, so that the direct current power distributor 33 transmits the cabinet control instruction to the target cabinet by using a power cable, so as to trigger the target cabinet to demodulate the cabinet control instruction from the power cable and after determining that an address of the target cabinet is the same as the address of the target cabinet included in the cabinet control instruction, perform a corresponding control operation in response to the cabinet control instruction.

In the method for controlling a radio base station described in FIG. 17, an out-of-band emergency channel based on a power cable can be established between an RRU and a BBU, so that even if a unique communications interface CPRI between the RRU and the BBU is abnormal, the RRU can still be effectively controlled by the BBU by using the out-of-band emergency channel. In addition, in the method for controlling a radio base station described in FIG. 17, out-of-band emergency channels based on power cables can be established between a BBU and cabinets, so that the BBU can effectively control a target cabinet by using an out-of-band emergency channel between the BBU and the target cabinet.

Figure 18:
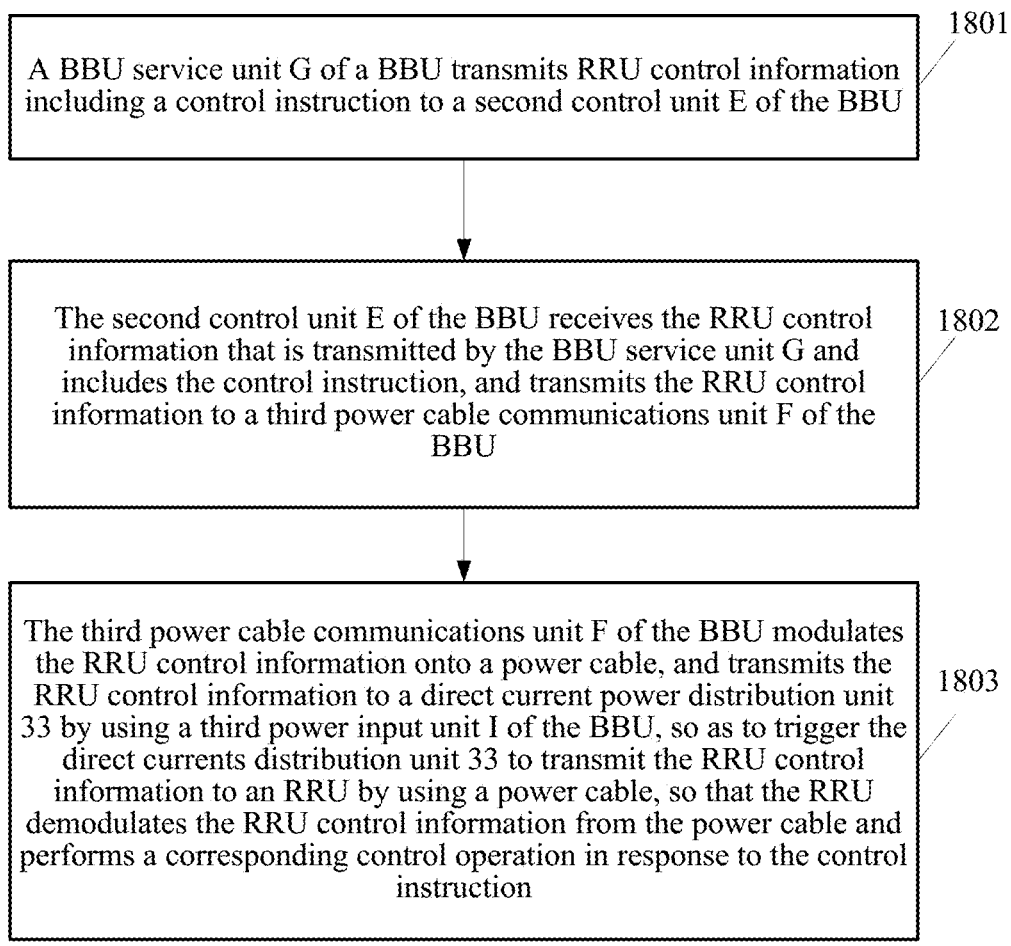
FIG. 18 is a schematic flowchart of another method for controlling a radio base station according to an embodiment of the present disclosure.

FIG. 18 is a schematic flowchart of another method for controlling a radio base station according to an embodiment of the present disclosure. The method for controlling a radio base station is described from a perspective of a BBU. As shown in FIG. 18, the method for controlling a radio base station may include the following steps.

1801. A BBU service unit G of a BBU transmits RRU control information including a control instruction to a second control unit E of the BBU.

1802. The second control unit E of the BBU receives the RRU control information that is transmitted by the BBU service unit G and includes the control instruction, and transmits the RRU control information to a third power cable communications unit F of the BBU.

1803. The third power cable communications unit F of the BBU modulates the RRU control information onto a power cable, and transmits the RRU control information to a direct current power distributor 33 by using a third power input unit I of the BBU, so as to trigger the direct current power distributor 33 to transmit the RRU control information to an RRU by using a power cable, so that the RRU demodulates the RRU control information from the power cable and performs a corresponding control operation in response to the control instruction.

In an embodiment, the RRU control information further includes an RRU address, where an address of the RRU that demodulates the RRU control information from the power cable is the same as the RRU address included in the RRU control information.

In an optional implementation manner, the method described in FIG. 18 may further include the following steps.

When the RRU identifies, according to the control instruction included in the RRU control information, that a to-be-performed operation type is an operation type performed by an RRU service unit, the third power cable communications unit F of the BBU demodulates, from the power cable, response information that is transmitted by the direct current power distributor 33 by using the third power input unit I of the BBU and includes an RRU service unit control result and an address of the BBU, and transmits the response information to the second control unit E of the BBU; or when the RRU identifies, according to the control instruction included in the RRU control information, that a to-be-performed operation type is a power operation type, the third power cable communications unit F of the BBU demodulates, from the power cable, response information that is transmitted by the direct current power distributor 33 by using the third power input unit I of the BBU and includes an RRU power control result and an address of the BBU, and transmits the response information to the second control unit E of the BBU; and the second control unit E of the BBU transmits the response information to the BBU service unit G of the BBU.

In an optional implementation manner, the method described in FIG. 18 may further include the following steps.

When the RRU identifies, according to the control instruction included in the RRU control information, that a to-be-performed operation type is a status information collection operation type, the third power cable communications unit F of the BBU demodulates, from the power cable, status feedback information that is transmitted by the direct current power distributor 33 by using the third power input unit I of the BBU and includes status information of the RRU and an address of the BBU, and transmits the status feedback information to the second control unit E of the BBU; and the second control unit E of the BBU transmits the status feedback information to the BBU service unit G of the BBU.

In an optional implementation manner, the method described in FIG. 18 may further include the following steps.

The BBU service unit G of the BBU transmits a cabinet control instruction including an address of a target cabinet to the second control unit E of the BBU; the second control unit E of the BBU receives the cabinet control instruction transmitted by the BBU service unit G of the BBU, and transmits the cabinet control instruction to the third power cable communications unit F of the BBU; and the third power cable communications unit F of the BBU modulates the cabinet control instruction onto a power cable, and transmits the cabinet control instruction to the direct current power distributor 33 by using the third power input unit I of the BBU, so that the direct current power distributor 33 transmits the cabinet control instruction to the target cabinet by using a power cable, so as to trigger the target cabinet to demodulate the cabinet control instruction from the power cable and after determining that an address of the target cabinet is the same as the address of the target cabinet included in the cabinet control instruction, perform a corresponding control operation in response to the cabinet control instruction.

In the method for controlling a radio base station described in FIG. 18, an out-of-band emergency channel based on a power cable can be established between an RRU and a BBU, so that even if a unique communications interface CPRI between the RRU and the BBU is abnormal, the BBU can still effectively control the RRU by using the out-of-band emergency channel. In addition, in the method for controlling a radio base station described in FIG. 18, out-of-band emergency channels based on power cables can be established between a BBU and cabinets, so that the BBU can effectively control a target cabinet by using an out-of-band emergency channel between the BBU and the target cabinet.

Figure 19:
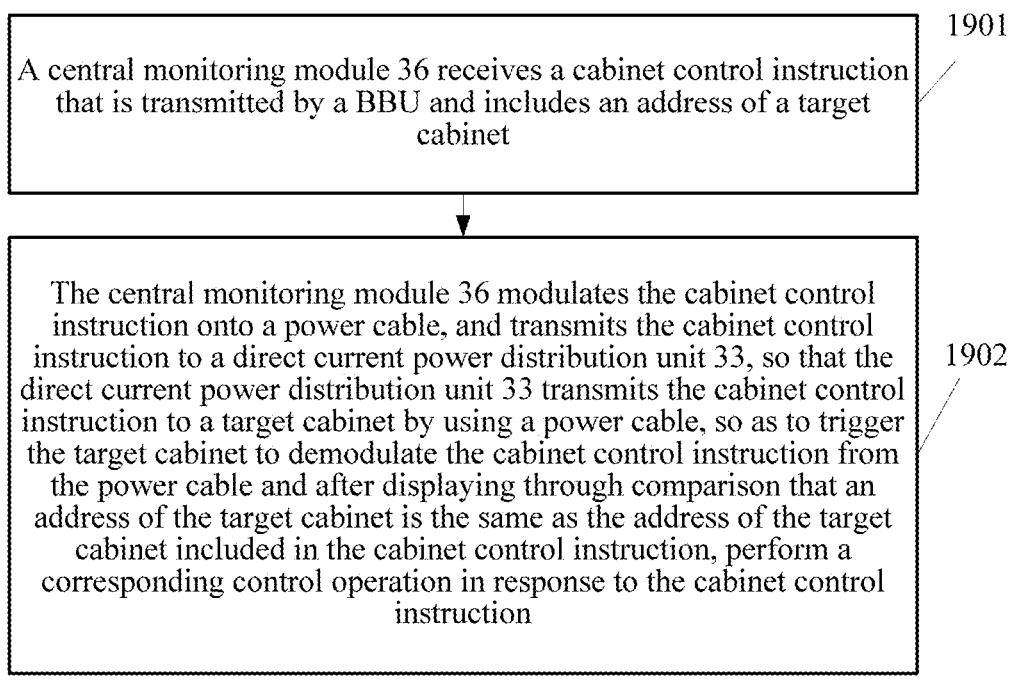
FIG. 19 is a schematic flowchart of another method for controlling a radio base station according to an embodiment of the present disclosure.

FIG. 19 is a schematic flowchart of another method for controlling a radio base station according to an embodiment of the present disclosure. The method for controlling a radio base station is described from a perspective of a central monitoring module 36. As shown in FIG. 19, the method for controlling a radio base station may include the following steps.

1901. A central monitoring module 36 receives a cabinet control instruction that is transmitted by a BBU and includes an address of a target cabinet.

1902. The central monitoring module 36 modulates the cabinet control instruction onto a power cable, and transmits the cabinet control instruction to a direct current power distributor 33, so that the direct current power distributor 33 transmits the cabinet control instruction to the target cabinet by using a power cable, so as to trigger the target cabinet to demodulate the cabinet control instruction from the power cable and after determining that an address of the target cabinet is the same as the address of the target cabinet included in the cabinet control instruction, perform a corresponding control operation in response to the cabinet control instruction.

Figure 20:
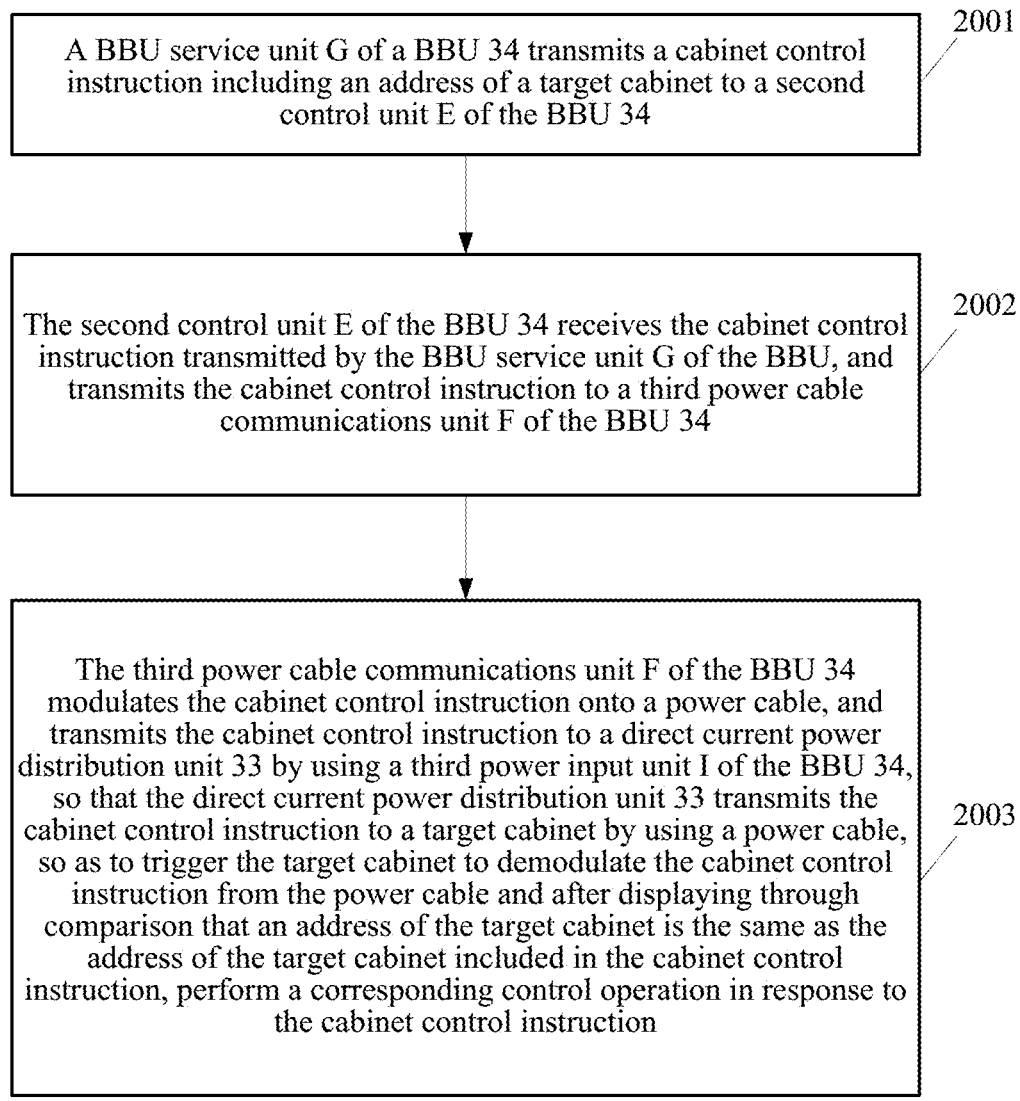
FIG. 20 is a schematic flowchart of another method for controlling a radio base station according to an embodiment of the present disclosure.

FIG. 20 is a schematic flowchart of another method for controlling a radio base station according to an embodiment of the present disclosure. The method for controlling a radio base station is described from a perspective of a BBU 34. As shown in FIG. 20, the method for controlling a radio base station may include the following steps.

2001. A BBU service unit G of a BBU 34 transmits a cabinet control instruction including an address of a target cabinet to a second control unit E of the BBU 34.

2002. The second control unit E of the BBU 34 receives the cabinet control instruction transmitted by the BBU service unit G of the BBU, and transmits the cabinet control instruction to a third power cable communications unit F of the BBU 34.

2003. The third power cable communications unit F of the BBU 34 modulates the cabinet control instruction onto a power cable, and transmits the cabinet control instruction to a direct current power distributor 33 by using a third power input unit I of the BBU 34, so that the direct current power distributor 33 transmits the cabinet control instruction to the target cabinet by using a power cable, so as to trigger the target cabinet to demodulate the cabinet control instruction from the power cable and after determining that an address of the target cabinet is the same as the address of the target cabinet included in the cabinet control instruction, perform a corresponding control operation in response to the cabinet control instruction.

In the methods described in FIG. 19 and FIG. 20, out-of-band emergency channels based on power cables can be established between a BBU and cabinets. In this way, if the BBU does not need to be connected to monitoring units in the cabinets by using monitoring cables, the BBU can control the cabinets by using corresponding power cables. Therefore, monitoring cables between the BBU and the cabinets are saved, and project installation costs and difficulty of a radio base station can be reduced.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disc.

A system and method for controlling a radio base station, and a related device that are disclosed by the embodiments of the present disclosure are described in detail above. In the specification, specific examples are used to describe principles and implementation manners of the present disclosure, and the foregoing descriptions of the embodiments are only intended to help understand the method and core idea of the present disclosure. In addition, a person of ordinary skill in the art may, based on the idea of the present disclosure, make modifications and variations with respect to the specific implementation manners and the application scope. In conclusion, content of the specification shall not be construed as a limitation to the present disclosure.

What is claimed is:
1. A baseband unit (BBU), comprising:
a third power input;
a third power converter;
a BBU service unit; and
a central monitor,
wherein the central monitor comprises a second controller and a third power cable communicator,
wherein the third power cable communicator and the third power converter are each configured to establish a power cable connection to a direct current power supply port of a direct current power distributor using the third power input,
wherein the third power cable communicator is coupled to the second controller,
wherein the second controller is coupled to the BBU service unit, wherein the BBU service unit is configured to couple to a remote radio unit (RRU) using a common public radio interface (CPRI), wherein the third power converter is configured to:
perform magnitude conversion on a direct current distributed by the direct current power distributor; and
output a converted direct current to the third power cable communicator, the second controller, and the BBU service unit, wherein the second controller is configured to:
receive RRU control information from the BBU service unit and comprises a control instruction; and
transmit the RRU control information to the third power cable communicator, and wherein the third power cable communicator is configured to:
modulate the RRU control information onto a power cable; and
transmit the RRU control information to the direct current power distributor using the third power input.

2. The BBU according to claim 1, wherein the RRU control information further comprises an RRU address, and wherein an address of the RRU is the same as the RRU address comprised in the RRU control information.

3. The BBU according to claim 1, wherein the third power cable communicator is further configured to:
demodulate, from the power cable, response information that is transmitted by the direct current power distributor using the third power input and comprises an RRU service unit control result and an address of the BBU when the RRU identifies, according to the control instruction comprised in the RRU control information, that a to-be-performed operation type is an operation type performed by an RRU service unit;
demodulate, from the power cable, the response information that is transmitted by the direct current power distributor using the third power input and comprises an RRU power control result and the address of the BBU when the RRU identifies, according to the control instruction comprised in the RRU control information, that the to-be-performed operation type is a power operation type; and
transmit the response information to the second controller, and wherein the second controller is further configured to transmit the response information to the BBU service unit.

4. The BBU according to claim 1, wherein when the RRU identifies, according to the control instruction comprised in the RRU control information, that a to-be-performed operation type is a status information collection operation type, the third power cable communicator is further configured to:
demodulate, from the power cable, status feedback information that is transmitted by the direct current power distributor using the third power input and comprises status information of the RRU and an address of the BBU; and
transmit the status feedback information to the second controller, and wherein the second controller is further configured to transmit the status feedback information to the BBU service unit.

* * * * *

UNITED STATES PATENT AND TRADEMARK OFFICE
CERTIFICATE OF CORRECTION

PATENT NO. : 10,135,493 B2
APPLICATION NO. : 15/804103
DATED : November 20, 2018
INVENTOR(S) : Qingyin Fang It is certified that error appears in the above-identified patent and that said Letters Patent is hereby corrected as shown below:

On the Title Page

Item (73), Line 1: "HUAWEI TECHNOLOGIES.," should read "HUAWEI TECHNOLOGIES CO.,"

Item (30), Line 1: "201410115041" should read "201410115041.5"

Signed and Sealed this
Twenty-ninth Day of January, 2019

Andrei Iancu
*Director of the United States Patent and Trademark Office*